(12) United States Patent
Sakai et al.

(10) Patent No.: US 9,703,184 B2
(45) Date of Patent: Jul. 11, 2017

(54) DIMMER AND PROJECTOR

(75) Inventors: Kenshi Sakai, Matsukawa-mura (JP);
Toshihiko Nagumo, Shiojiri (JP);
Toshihiko Sakai, Matsumotoshi (JP);
Nobuyuki Otsuki, Matsumoto (JP);
Takuro Onota, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 155 days.

(21) Appl. No.: 13/568,818

(22) Filed: Aug. 7, 2012

(65) Prior Publication Data
US 2013/0038646 A1 Feb. 14, 2013

(30) Foreign Application Priority Data

Aug. 12, 2011 (JP) ................................ 2011-176578
Aug. 24, 2011 (JP) ................................ 2011-182510

(51) Int. Cl.
*G03B 21/14* (2006.01)
*G03B 21/20* (2006.01)

(52) U.S. Cl.
CPC ......... *G03B 21/2053* (2013.01); *G03B 21/14* (2013.01); *G03B 21/208* (2013.01)

(58) Field of Classification Search
CPC .................................................. H04N 5/7408
See application file for complete search history.

(56) References Cited

U.S. PATENT DOCUMENTS

| | | | |
|---|---|---|---|
| 2006/0050248 A1* | 3/2006 | Koga | G03B 21/2053 353/97 |
| 2006/0055894 A1 | 3/2006 | Furihata | |
| 2007/0035702 A1 | 2/2007 | Shimizu et al. | |
| 2008/0304022 A1 | 12/2008 | Yamada et al. | |
| 2009/0002313 A1* | 1/2009 | Iisaka | F21V 11/18 345/109 |
| 2010/0188640 A1* | 7/2010 | Nakano | G03B 21/208 353/56 |
| 2010/0238419 A1 | 9/2010 | Mochizuki | |
| 2010/0245782 A1 | 9/2010 | Shimizu et al. | |
| 2011/0022026 A1 | 1/2011 | Sorensen et al. | |
| 2011/0096302 A1 | 4/2011 | Mochizuki et al. | |
| 2011/0222026 A1* | 9/2011 | Usuda | G03B 21/2053 353/97 |

(Continued)

FOREIGN PATENT DOCUMENTS

| | | |
|---|---|---|
| CN | 101825834 A | 9/2010 |
| JP | 2006-106691 A | 4/2006 |

(Continued)

*Primary Examiner* — Jennifer Mehmood
*Assistant Examiner* — Carl Adams
(74) *Attorney, Agent, or Firm* — Oliff PLC

(57) ABSTRACT

A dimmer includes a pair of pivoting sections provided across an optical axis of a light beam and having pivot axes and a pair of light blocking sections held by the pair of pivoting sections and configured to pivot following pivoting of the pivoting sections to block the light beam. In a maximum light blocking state, positions in the optical axis direction of opposed ends on the optical axis side of the pair of light blocking sections are different from each other. In the maximum light blocking state, the opposed ends on the optical axis side of the pair of light blocking sections are arranged to overlap each other in a direction along the optical axis.

16 Claims, 19 Drawing Sheets

(56) References Cited

U.S. PATENT DOCUMENTS

| | | | |
|---|---|---|---|
| 2011/0299048 A1 | 12/2011 | Shimizu et al. |
| 2012/0008107 A1 | 1/2012 | Yamada et al. |
| 2012/0127438 A1 | 5/2012 | Shimizu et al. |
| 2013/0229636 A1 | 9/2013 | Shimizu et al. |
| 2014/0313491 A1 | 10/2014 | Shimizu et al. |

FOREIGN PATENT DOCUMENTS

| | | |
|---|---|---|
| JP | 2006-343512 A | 12/2006 |
| JP | 2006-343513 A | 12/2006 |
| JP | 2007-047339 A | 2/2007 |
| JP | 2008-145949 A | 6/2008 |
| JP | 2010-054610 A | 3/2010 |
| JP | 2010-175682 A | 8/2010 |
| JP | A-2010-175679 | 8/2010 |
| JP | A-2010-217651 | 9/2010 |
| JP | A-2011-118322 | 6/2011 |
| TW | 201030446 A1 | 8/2010 |
| WO | 2010-038731 A1 | 4/2010 |

\* cited by examiner

DIMMER AND PROJECTOR

BACKGROUND

1. Technical Field

The present invention relates to a dimmer and a projector.

2. Related Art

As a projector in which a light blocking member is used for adjustment of a lighting device, there is known a projector in which a pair of tabular light blocking members that can be opened and closed by pivoting are symmetrically arranged across an illumination optical axis between a pair of lens arrays in the lighting device to adjust a light blocking amount of illumination light. There is also known a projector in which a block-like light blocking body is used as such a light blocking member and a dent like a cutout is provided in the light blocking body to adjust a change in a light blocking amount. However, when such a block-like light blocking body having the cutout is used as the light blocking member, it is necessary to form a complicated curved surface at an end of the light blocking body in order to set the change in the light blocking amount to a desired change. In this case, a space for the light blocking body is also necessary. However, a space around the pair of lens arrays is limited. Therefore, it may be difficult to set the block-like light blocking body.

Therefore, JP-A-2010-217651 proposes a configuration in which a light blocking section includes a first light blocking member and a second light blocking member. Since the first light blocking member includes a cutout section, it is possible to make a change in a light blocking amount relatively gentle. The second light blocking member changes a light blocking region for light corresponding to the cutout section to block all or a part of a light beam corresponding to the cutout section during full closing of the first light blocking member.

JP-A-2011-118322 discloses a projector including an illumination optical system including a light source, light blocking sections that can partially block a light beam from the light source, and a driving mechanism that causes the light blocking sections to operate and a light modulating device illuminated by illumination light from the illumination optical system. The light blocking sections are driven by the driving mechanism to pivot around predetermined pivot axes to change the size of a blocking region. The light blocking sections include distal end side ends corresponding to a boundary between the blocking region and a non-blocking region during pivoting. The distal end side ends include a first region and a second region located further on the light source side than the first region during the pivoting of the light blocking sections. The first region is divided into plural regions at the distal end side ends. The second region is located between the divided regions of the first region. With this configuration, it is possible to provide a projector that can sufficiently reduce an illumination light amount in a maximum blocked state while making a change in a light blocking amount relatively gentle.

The pair of light blocking members described in JP-A-2011-418322 open and close in the center in an up down direction (or left right direction) with respect to an optical axis of a light beam emitted from a lighting device to adjust a light amount of the emitted light beam. The pair of light blocking members are set to have a fixed space (separation distance) between ends on the optical axis side of the pair of light blocking members in a state in which the light amount is the smallest (a state in which the light blocking members close).

However, when light blocking is performed by causing the pair of tabular light blocking members to open and close, it is likely that a change in a light blocking amount is not gentle. Therefore, color unevenness tends to occur. Further, fluctuation in position control for the light blocking members increases. As a result, there is a limit in a light blocking amount (a closing amount) by the light blocking members in order to suppress the color unevenness to permissible color unevenness. Therefore, it is difficult to increase a contrast ratio.

When an extinction ratio (a ratio of blocking of a light beam) by a dimmer is improved, it is necessary to reduce the separation distance between the ends of the light blocking members in the state in which a light amount is the smallest (the state in which the light blocking members are close).

When the light blocking sections are arranged on a downstream side of an optical path where the light beam from the light source is changed to a partial light beam using a lens array in which small lenses are arranged in a matrix shape as described in JP-A-2011-118322, if a region between the pair of light blocking sections in a maximum light blocking state does not include the center of the small lenses of the lens array and is a boundary of the small lenses or a peripheral region of the boundary, the intensity of the light beam in the boundary and the peripheral region of the boundary is low compared with the center. Therefore, even if the separation distance is large, a relatively high extinction ratio can be set. However, if the region between the pair of light blocking sections in the maximum light blocking state includes the center of the small lenses of the lens array where the intensity of the light beam is high, it is difficult to obtain a sufficient extinction ratio unless the separation distance is set particularly small. However, if the separation distance is set small or removed, the light blocking members interfere with each other because of fluctuation in machining accuracy of the light blocking members, assembly accuracy of the dimmer, and the like.

Therefore, there is a demand for a dimmer and a projector that can maintain a separation distance between ends of light blocking members to improve an extinction ratio and can suppress color unevenness to realize a high contrast ratio.

SUMMARY

An advantage of some aspects of the invention is to solve at least a part of the problems described above, and the invention can be implemented as the following forms or application examples.

APPLICATION EXAMPLE 1

This application example of the invention is directed to a dimmer that blocks an incident light beam and adjusts a passing light amount, the dimmer including: a pair of pivoting sections provided across an optical axis of the light beam and having pivot axes that extend along a direction substantially orthogonal to the optical axis; a pair of light blocking sections held by the pair of pivoting sections, formed to extend in the direction substantially orthogonal to the optical axis, and configured to pivot following pivoting of the pivoting sections to block the light beam. In a state in which the passing light amount is the smallest, positions in the optical axis direction of opposed ends on the optical axis side of the pair of light blocking sections are different from each other.

In such a dimmer, the positions of the opposed ends on the optical axis side of the pair of light blocking sections are set different from each other in the optical axis direction. Therefore, it is possible to secure a separation distance between the ends on the optical axis side of the light blocking sections in an optical axis direction and reduce a separation distance between ends of the light blocking sections in a plane perpendicular to the optical axis. Consequently, it is possible to allow fluctuation in machining accuracy of the light blocking sections and assembly accuracy of the dimmer and improve an extinction ratio.

APPLICATION EXAMPLE 2

In the dimmer of the above application example, it is preferable that the opposed ends on the optical axis side of the pair of light blocking sections are arranged to overlap each other in a direction along the optical axis in the state in which the passing light amount is the smallest.

In such a dimmer, the opposed ends on the optical axis side of the pair of light blocking sections are arranged to overlap each other in the direction along the optical axis in the state in which the passing light amount is the smallest. Therefore, it is possible to block the light beam from the light source. In particular, a center side of the light beam having high luminance is blocked to suppress color unevenness.

APPLICATION EXAMPLE 3

In the dimmer of the above application example, it is preferable that first cutout sections are provided on both end sides of the ends on the optical axis side of the pair of light blocking sections.

In such a dimmer, in the state in which the passing light amount is the smallest, the pair of light blocking sections can block, with the ends that overlap each other, the light beam from the light source and can cause, with the first cutout sections formed on both the end sides of the ends, a part of the light beam to leak. Consequently, for example, when the dimmer is built in a projector, a desired contrast ratio can be obtained. Since the first cutout sections are formed on both the end sides of the ends, for example, high contrast is obtained by leak light made incident on a light modulating device of the projector.

APPLICATION EXAMPLE 4

In the dimmer of the above application example, it is preferable that the pair of light blocking sections include first light blocking members formed to extend in the direction substantially orthogonal to the optical axis in the state in which the passing light amount is the smallest and second light blocking members formed on an optical path downstream side of the light beam with respect to the first light blocking members to incline with respect to the first light blocking members such that distal end sides of the second light blocking members separate from the first light blocking members.

In such a dimmer, when the pair of light blocking sections rotate, a light beam is blocked not only in the first light blocking members but also in the second light blocking members. Therefore, it is possible to make a change in a light blocking amount relatively gentle. Further, it is possible to sufficiently reduce an illumination light amount in the state in which the passing light amount is the smallest.

APPLICATION EXAMPLE 5

In the dimmer of the above application example, it is preferable that the first cutout sections are provided in the first light blocking members and second cutout sections are provided in the center of opposed distal ends on the optical axis side of the second light blocking members.

In such a dimmer, light is leaked from the second cutout sections provided in the center of the distal ends on the optical axis side of the second light blocking members. Therefore, it is possible to make a change in a light blocking amount relatively gentle.

APPLICATION EXAMPLE 6

In the dimmer of the above application example, it is preferable that the pair of light blocking sections include third light blocking members formed to extend in the direction substantially orthogonal to the optical axis and fourth light blocking members formed to extend from distal ends on the optical axis side of the third light blocking members and bend to the optical axis side in the state in which the passing light amount is the smallest. Positions in the direction along the optical axis of opposed ends on the optical axis side of the fourth light blocking members are different from each other.

In such a dimmer, for example, even if the third blocking members are formed to be substantially parallel to each other such that surfaces thereof are substantially flush with each other in the state in which the passing light amount is the smallest, the positions of the opposed ends on the optical axis side of the fourth light blocking members are set different from each other in the optical axis direction. Therefore, it is possible to allow fluctuation in machining accuracy of the light blocking sections and assembly accuracy of the dimmer. Further, it is possible to improve an extinction ratio.

APPLICATION EXAMPLE 7

In the dimmer of the above application example, it is preferable that one fourth light blocking member is formed to bend from the distal end on the optical axis side of one third light blocking member to an optical path downstream side of the light beam. The other fourth light blocking member is formed to bend from the distal end on the optical axis side of the other third light blocking member to an optical path upstream side of the light beam.

In such a dimmer, one fourth light blocking member is formed to bend to the optical path downstream side and the other fourth light blocking member is formed to bend to the optical path upstream side. Therefore, it is possible to set the positions of the opposed ends on the optical axis side different from each other in the optical axis direction. With this configuration, it is possible to form the fourth light blocking member in a simple shape. Further, it is possible to accomplish the effects explained above.

APPLICATION EXAMPLE 8

In the dimmer of the above application example, it is preferable that third cutout sections are provided in the center of the distal ends on the optical axis side of the pair of light blocking sections.

In such a dimmer, a change in the passing light amount can be adjusted. Therefore, it is possible to make a change in the passing light amount (a change in a light blocking amount) gentle. Further, it is possible to suppress occurrence of color unevenness.

APPLICATION EXAMPLE 9

In the dimmer of the above application example, it is preferable that, in the pair of light blocking sections, at least one of the sizes and the shapes of the third cutout sections are different from each other.

In such a dimmer, at least one of the sizes and the shapes of the opposed third cutout sections are set different to correspond to the positions of the ends on the optical axis side of the opposed light blocking sections set different in the optical axis direction. Therefore, it is possible to make a change in the passing light amount gentler. Further, it is possible to further suppress occurrence of color unevenness.

APPLICATION EXAMPLE 10

This application example of the invention is directed to a projector including: (a) a light source device that emits a light beam; (b) a light modulating device that modulates the light beam according to an image signal and forms image light; and (c) a dimmer including: (c1) a pair of pivoting sections provided across an optical axis of the light beam and having pivot axes that extend along a direction substantially orthogonal to the optical axis; and (c2) a pair of light blocking sections held by the pair of pivoting sections, formed to extend in the direction substantially orthogonal to the optical axis, and configured to pivot following pivoting of the pivoting sections to block the light beam, in a state in which a passing light amount is the smallest, positions in the optical axis direction of opposed ends on the optical axis side of the pair of light blocking sections being different from each other.

In such a projector, a light beam emitted from the light source device can be adjusted by improving an extinction ratio with the dimmer. The adjusted light beam is modulated by the light modulating device according to an image signal to form image light. Consequently, it is possible to further improve contract of the formed image light than in the past. When cutout sections are provided in the dimmer, it is possible to make a change in the passing light amount gentle. Therefore, it is possible to suppress a sudden change in the brightness of the image light and suppress color unevenness.

APPLICATION EXAMPLE 11

In the projector of the above application example, it is preferable that, in the dimmer, the opposed ends on the optical axis side of the pair of light blocking sections are arranged to overlap each other in a direction along the optical axis in the state in which the passing light amount is the smallest.

In such a projector, the opposed ends on the optical axis side of the pair of light blocking sections are arranged to overlap each other in the direction along the optical axis in the state in which the passing light amount is the smallest. Therefore, it is possible to block the light beam from the light source. In particular, a center side of the light beam having high luminance is blocked to suppress color unevenness.

APPLICATION EXAMPLE 12

In the projector of the above application example, it is preferable that the projector further includes a lens array including a plurality of small lenses that convert the light beam emitted from the light source device into partial light beams. The dimmer is arranged on the opposite side of the light source device with respect to the lens array. When viewed from the optical axis side, the center of at least one small lens among the plurality of small lenses is arranged in a region between the optical axis side ends of the pair of light blocking sections in the state in which the passing light amount is the smallest.

In such a projector, in the state in which the passing light amount is the smallest, even if the center of the small lens of the lens array where the intensity of the light beam is high is arranged in the region between the optical axis side ends of the pair of light blocking sections, the positions of the ends on the optical axis side are set different from each other in the optical axis direction by the dimmer. Consequently, since a separation distance between the ends on the optical axis side of the light blocking sections can be secured in the optical axis direction, it is possible to reduce the separation distance between the ends of the light blocking sections in a plane perpendicular to the optical axis. Therefore, it is possible to realize a projector that can improve an extinction ratio and improve contrast even if the center of at least one small lens among the plurality of small lenses is arranged in the region between the optical axis side ends of the pair of light blocking sections in the state in which the passing light amount is the smallest.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention are explained below with reference to the drawings.

First Embodiment

A projector 1 according to a first embodiment is explained below with reference to the drawings.

The projector 1 according to this embodiment modulates a light beam, which is emitted from a light source 311, according to image information to form image light and projects the image light in enlargement.

Figure 1:
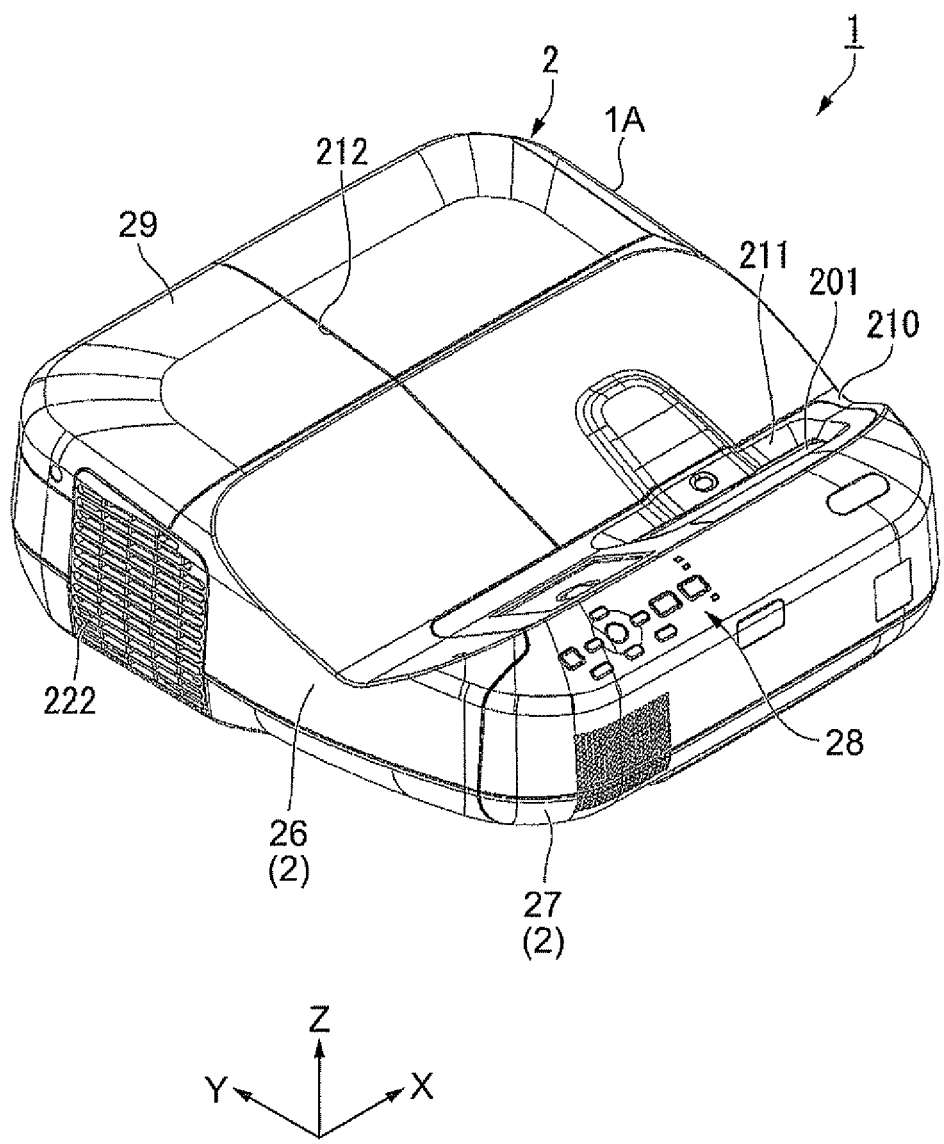
FIG. 1 is a perspective view showing the configuration of a projector according to a first embodiment.
Figure 2:
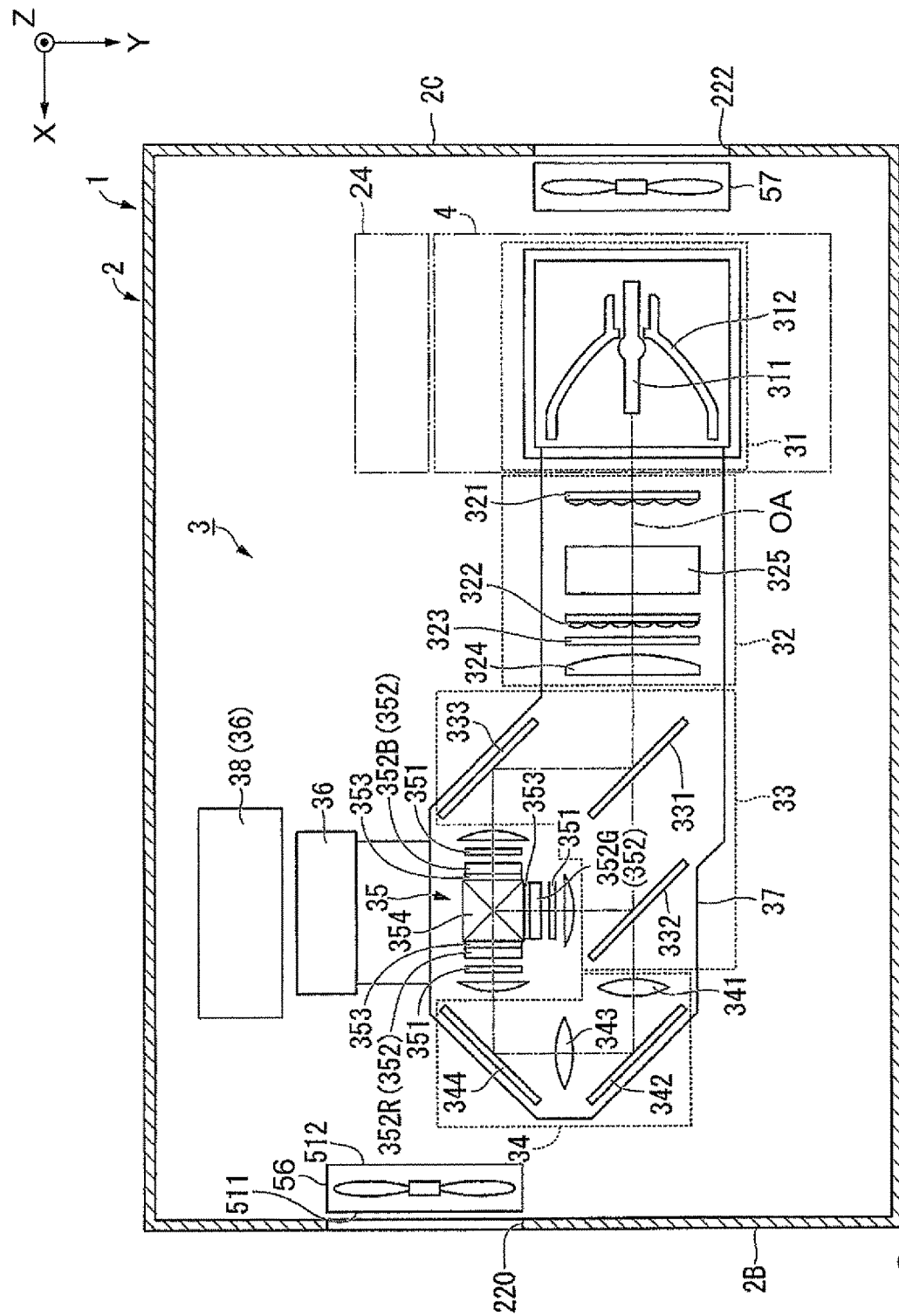
FIG. 2 is a diagram showing a schematic configuration of the projector.

FIG. 1 is a perspective view showing the configuration of the projector 1 according to the first embodiment. In the figure, a cable cover (not shown) is removed. FIG. 2 is a diagram showing a schematic configuration of the projector 1.

As shown in FIG. 1, the projector 1 has a configuration in which a projector body 1A is surrounded by an armor housing 2. The armor housing 2 is made of synthetic resin. The armor housing 2 includes a first case 26 that forms a housing upper section and a second case 27 that forms a housing lower section. The first case 26 and the second case 27 are fixed by screws or the like.

In the armor housing 2, as shown in FIG. 2, a control section 24, an optical unit 3, a power supply unit 4, a cooling fan 56, an exhaust fan 57, and the like are arranged. The optical unit 3 is formed in a substantially L shape in plan view. The optical unit 3 includes a light source device 31 including the light source 311, an electro-optical device 35, and a projection optical device 36. The optical unit 3 optically processes, on the basis of control by the control section 24, a light beam emitted from the light source 311, forms image light corresponding to image information in the electro-optical device 35, and causes the projection optical device 36 to project the image light on a screen or the like (not shown in the figure).

In the drawings referred to below including FIG. 1, dimensions and ratios of components are shown different from actual ones as appropriate to show the components in sizes recognizable on the drawings. Further, in the drawings, for convenience of explanation, an XYZ orthogonal coordinate system is adopted. In the XYZ orthogonal coordinate system, a direction in which a light beam is emitted from the light source device 31 is represented as +X direction. A direction along the horizontal direction among directions orthogonal to the X direction and opposite to a direction in which image light is emitted from the electro-optical device 35 is represented as +Y direction. A direction orthogonal to the X direction and the Y direction and upward in a desk-set posture is represented as +Z direction. An X direction distal end side is a light beam emitting direction (an optical path downstream side). An X direction proximal end side is a light beam incident direction (an optical path upstream side).

The light source device 31 is arranged at an end of the armor housing 2. The projection optical device 36 is arranged substantially in the center of the armor housing 2. The control section 24 is configured as a circuit board mounted with a CPU (Central Processing Unit), a RAM (Random Access Memory), a ROM (Read Only Memory), and the like. The control section 24 functions as a computer and performs control of the operation of the projector 1, for example, control related to projection of an image. The position of the control section 24 shown in FIG. 2 is schematically shown and is different from an actual position. The control section 24 is arranged in a form for covering the optical unit 3.

Referring back to FIG. 1, a recess 210 is formed on the upper surface of the first case 26 of the armor housing 2, which houses the components explained above. A recess 211 having a rectangular shape in plan view is further formed on the side of one inclined surface included in the recess 210. A projection window 201 is provided on the bottom surface of the recess 211. Image light emitted from the projection optical device 36 is emitted from the projection window 201 toward the back of the armor housing 2 (a lamp cover 29 side in FIG. 1).

An operation section 28 including plural operation keys for performing various kinds of setting of the projector 1 is provided in the front of the first case 26. An opening section 212 for replacement of the light source device 31 is formed in the back of the first case 26. The lamp cover 29 is attached to the first case 26, whereby the opening section 212 is closed.

An intake port 220 for taking in the outdoor air is provided on a side 2B of the armor housing 2. The intake port 220 is formed by plural rectangular slit holes. A not-shown dust filter is arranged on the inner side of the intake port 220. The optical unit 3 is cooled by the air taken in from the intake port 220 and allowed to pass the dust filter.

An exhaust port 222 for discharging warm air on the inside is provided on the right side (a side 2C) of the armor housing 2. The exhaust port 222 is formed by plural slit holes. The air in the armor housing 2 warmed by, for example, lighting of the light source 311 (FIG. 2) is discharged from the exhaust port 222 to the outside.

Components of the optical unit 3 are explained with reference to FIGS. 2 and 3.

Figure 3:
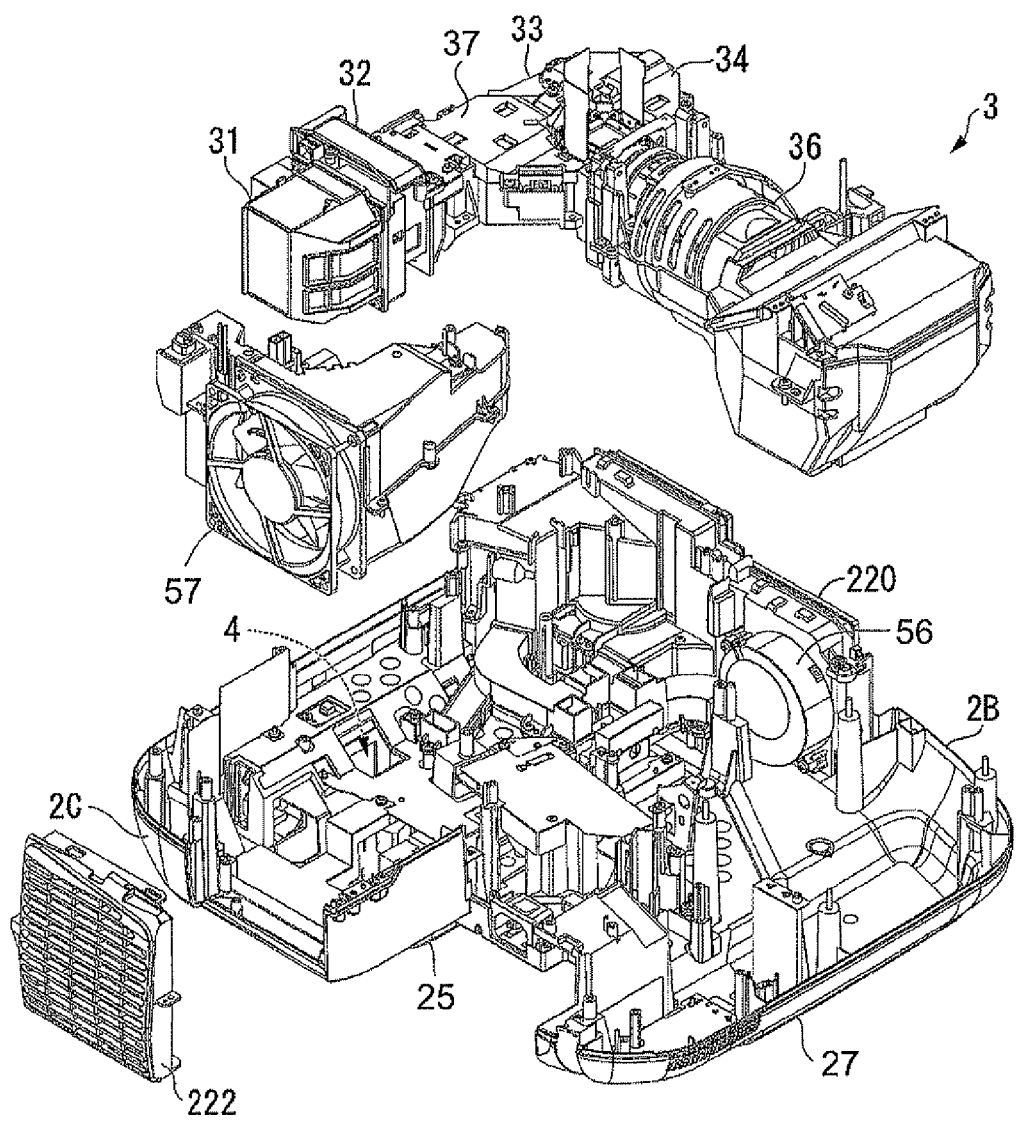
FIG. 3 is a diagram showing an internal configuration of the projector.

FIG. 3 is a diagram showing an internal configuration of the projector 1.

As shown in FIGS. 2 and 3, the optical unit 3 is formed in an L shape in plan view. The optical unit 3 includes the light source device 31, an illumination optical device 32, a color separation optical device 33, a relay optical device 34, the electro-optical device 35, the projection optical device 36, and an optical component housing 37 for arranging the optical components 31 to 36 in predetermined positions.

The light source device 31 includes the light source 311 of a discharge type including an extra-high pressure mercury lamp or a metal halide lamp and a reflector 312. The light source device 31 aligns, with the reflector 312, an emitting direction of a light beam emitted from the light source 311 and emits the light beam to the illumination optical device 32.

The illumination optical device 32 includes a first lens array 321, a second lens array 322, a polarization converting element 323, a superimposing lens 324, and a dimmer 325.

The first lens array 321 has a configuration in which small lenses 321a having a rectangular contour viewed from an optical axis OA direction of a light beam emitted from the light source 311 are arrayed in a matrix shape. The first lens array 321 divides the light beam emitted from the light source device 31 into plural partial light beams. The second lens array 322 has a configuration substantially the same as the configuration of the first lens array 321. The second lens array 322 generally superimposes, in conjunction with the superimposing lens 324, the partial light beams on the surface of a liquid crystal light valve 352 functioning as a light modulating device. The polarization converting element 323 has a function of aligning random polarized lights emitted from the second lens array 322 into generally one kind of polarized light usable in the liquid crystal light valve 352.

The dimmer 325 includes a pair of light blocking sections 60a and 60b (FIG. 4) that block a part of the light beam emitted from the light source 311. The dimmer 325 has a function of adjusting a passing light amount of the light beam. Although a detailed configuration is explained below, the dimmer 325 blocks, with the light blocking sections 60a and 60b, a part of the light beam emitted from the light source 311 and transmitted through the first lens array 321 and adjusts an amount of light made incident on the second lens array 322. The dimmer 325 can adjust the amount of light made incident on the second lens array 322 and an amount of light made incident on the electro-optical device 35. Therefore, the dimmer 325 contributes to improvement of the contrast of a projected image by adjusting a light amount of a light beam according to a scene.

The color separation optical device 33 includes two dichroic mirrors 331 and 332 and a reflection mirror 333. The color separation optical device 33 has a function of separating the light beam emitted from the illumination optical device into color lights of three colors, i.e., red light (hereinafter referred to as R light), green light (hereinafter referred to as "G light"), and blue light (hereinafter referred to as "B light").

The relay optical device 34 includes an incident side lens 341, a relay lens 343, and reflection mirrors 342 and 344. The relay optical device 34 has a function of leading the R light transmitted through the second dichroic mirror 332 to a liquid crystal light valve 352R for the R light. In the optical unit 3, the relay optical device 34 is configured to lead the R light. However, the relay optical device 34 is not limited to this configuration and may be configured to lead the B light.

The electro-optical device 35 includes an incidence-side sheet polarizer 351, a liquid crystal light valve 352 functioning as a light modulating device, an emission-side sheet polarizer 353, and a cross dichroic prism 354 functioning as a color combining optical device. The electro-optical device 35 modulates, according to image information, the color lights emitted from the color separation optical device 33.

The projection optical device 36 includes a compound lens formed by combining plural lenses and a reflection mirror 38 having an aspherical shape. The projection optical device 36 emits the light beam modulated by the electro-optical device 35 from the compound lens to the reflection mirror 38 and reflects and projects the light beam with the reflection mirror 38 while increasing an angle of the light beam. By adopting such a structure, the projector 1 can be configured as a so-called short-focus projector having a short projection distance.

The power supply unit 4 rectifies and smoothes alternating-current power supplied from an external power supply and outputs the power supply to the light source 311, the control section 29, and the like. The power supply unit 4 is disposed below the light source device 31. Specifically, the power supply unit 4 is housed in a power supply case 25 (FIG. 3) mounted on the bottom of the second case 27.

The cooling fan 56 includes a sirocco fan that discharges the air, which is sucked from a rotation axis direction, in a rotation tangential direction. The cooling fan 56 is arranged on the inner side of an intake port 220 and near the relay optical device 34. The cooling fan 56 is arranged such that a suction port 511 for sucking the outdoor air faces the intake port 220 side and a discharge port 512 for discharging the air faces the relay optical device 34 side. The cooling fan 56 cools the relay optical device 34 by discharging the outdoor air taken in by the suction port 511 to the relay optical device 34 that generates heat.

The exhaust fan 57 includes an axial fan. The exhaust fan 57 is arranged on the inner side of the exhaust port 222 and between the exhaust port 222 and the light source device 31. The exhaust fan 57 discharges the air warmed through the cooling of the light source device 31 or the like to the outside of the armor housing 2 via the exhaust port 222.

The control section 24 includes a main circuit board (not shown in the figure) mounted with a CPU, a RAM, a ROM, and the like and a driver board (not shown in the figure). The control section 24 autonomously controls the projector 1 according to operation by a user.

The configuration of the dimmer 325 is explained.

Figure 4:
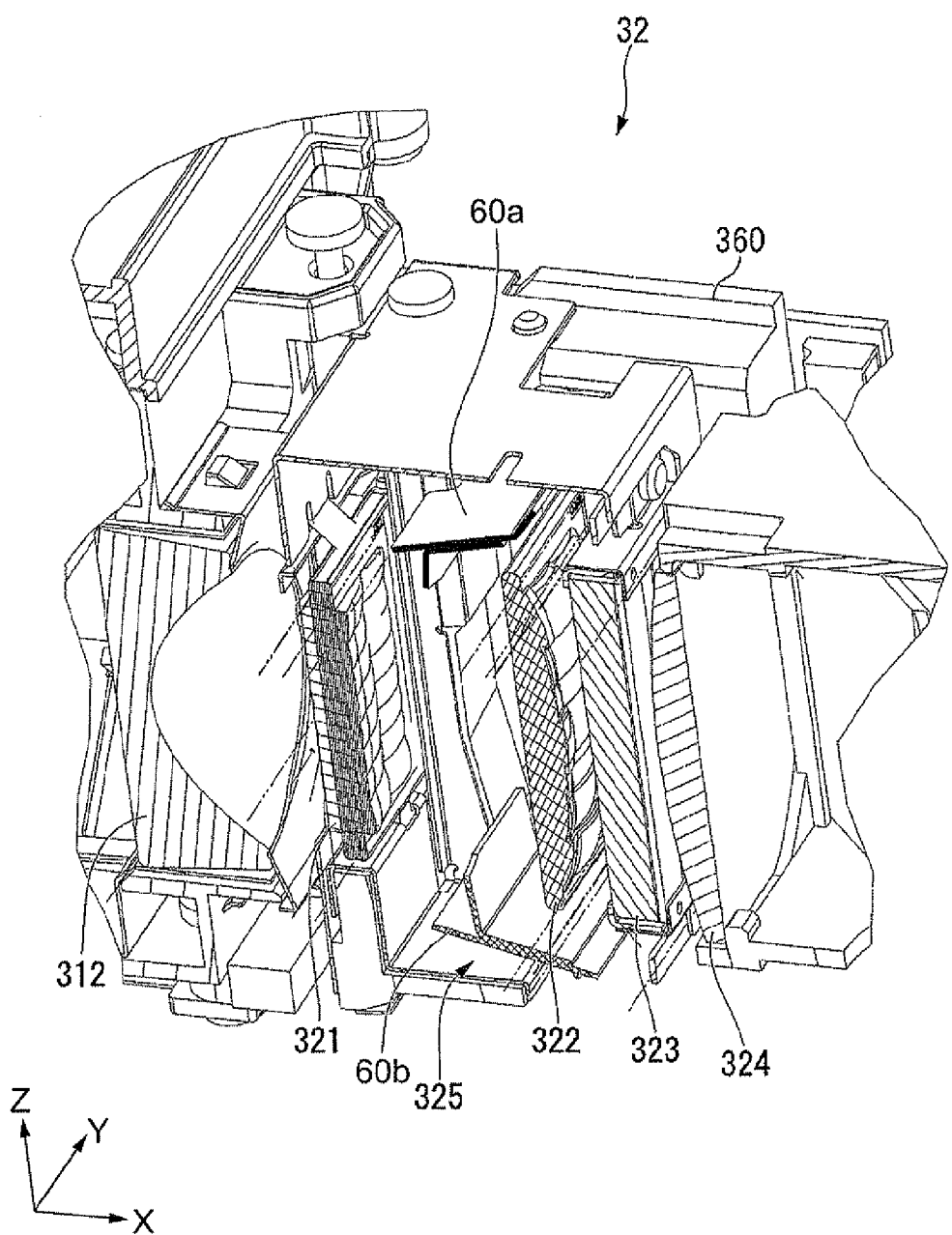
FIG. 4 is a partially enlarged sectional view mainly showing a dimmer.
Figure 5:
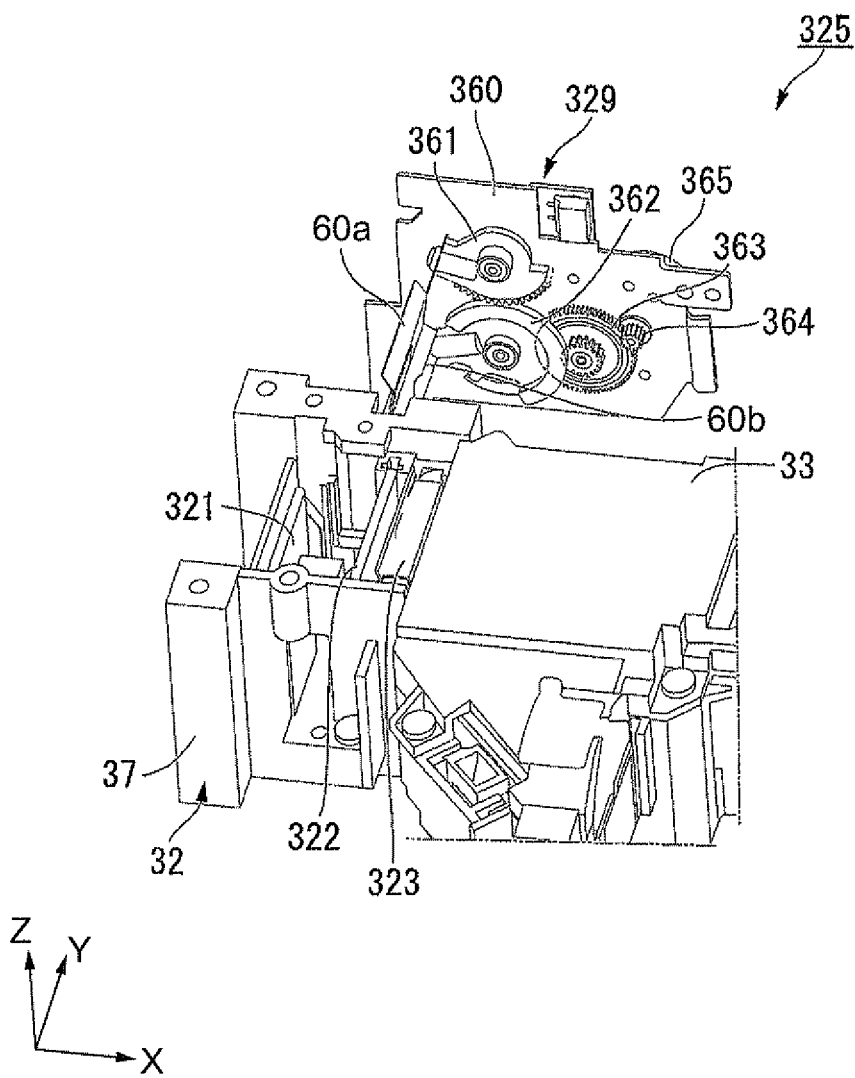
FIG. 5 is an exploded view showing the configuration of the dimmer.
Figure 6:
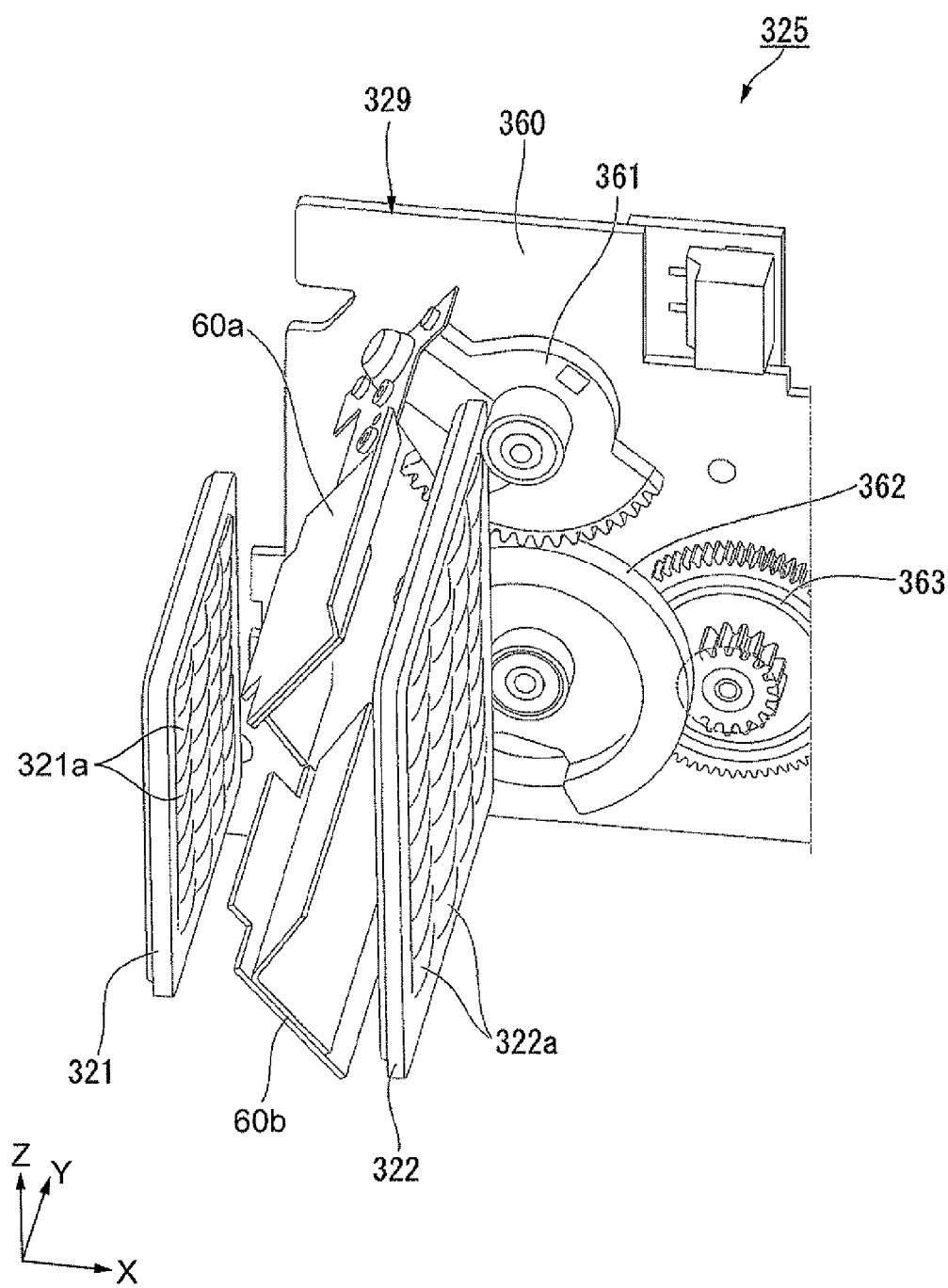
FIG. 6 is a diagram showing a positional relation between light blocking members and a lens array.

FIG. 4 is a partially enlarged sectional view mainly showing the dimmer 325. FIG. 5 is an exploded view showing the configuration of the dimmer 325. FIG. 6 is a diagram showing a positional relation between the light blocking sections 60a and 60b and the lens arrays 321 and 322. In the figures referred to below and the following explanation, pairs of components are distinguished by affixing "a" to signs of one members and affixing "b" to signs of the other members.

As shown in FIG. 4, the dimmer 325 includes the pair of light blocking sections 60a and 60b disposed between the first lens array 321 and the second lens array 322. Such a dimmer 325 is inserted by inserting the light blocking sections 60a and 60b from a side of the optical component housing 37, which is a side of the illumination optical device 32, as shown in FIG. 5. The dimmer 325 is assembled by screwing a fixed section body 360 to the optical component housing 37. In an assembled state, as shown in FIG. 6, the dimmer 325 is vertically arranged such that the light blocking sections 60a and 60b are placed side by side along a surface direction of the first lens array 321 and the second lens array 322 between the lens arrays.

Figure 7A:
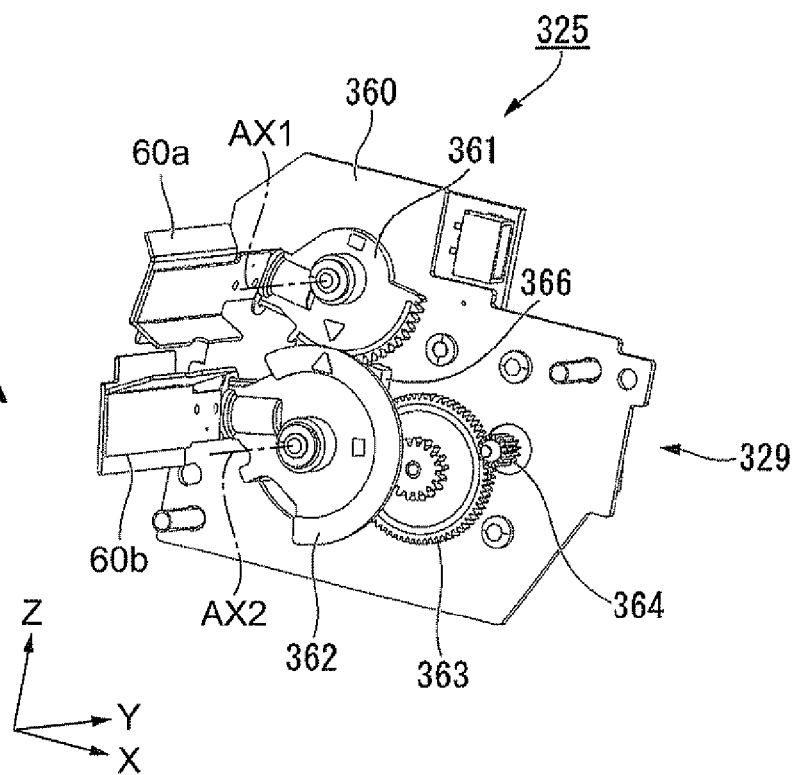
FIGS. 7A and 7B are diagrams specifically showing an overall configuration of the dimmer.
Figure 7B:
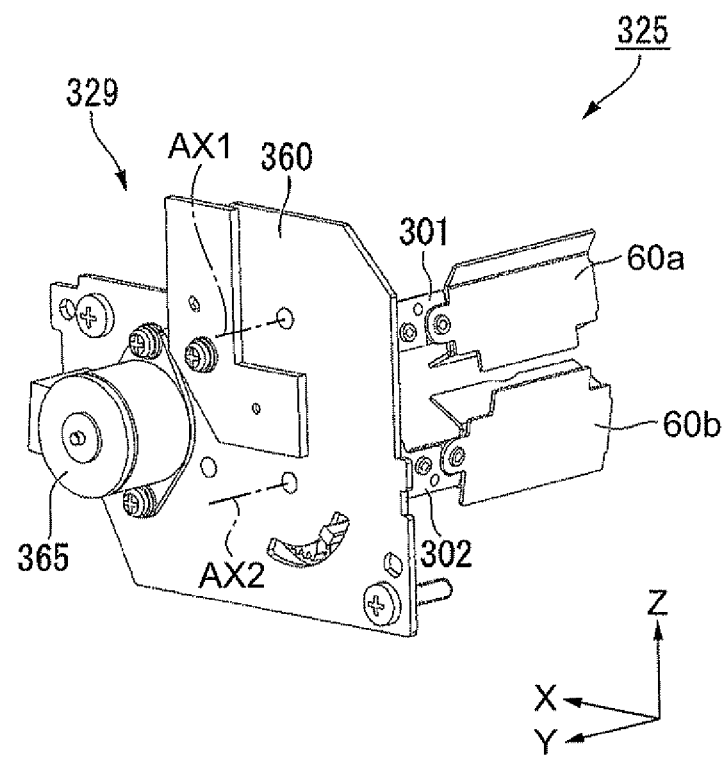
Figure 8:
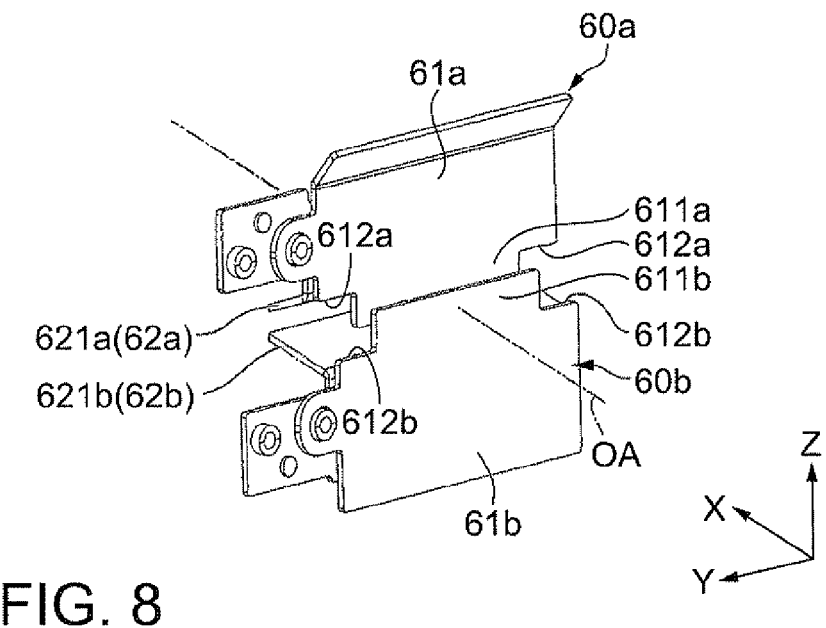
FIG. 8 is a perspective view specifically showing the configuration of a pair of light blocking sections.
Figures 9A, 9B:
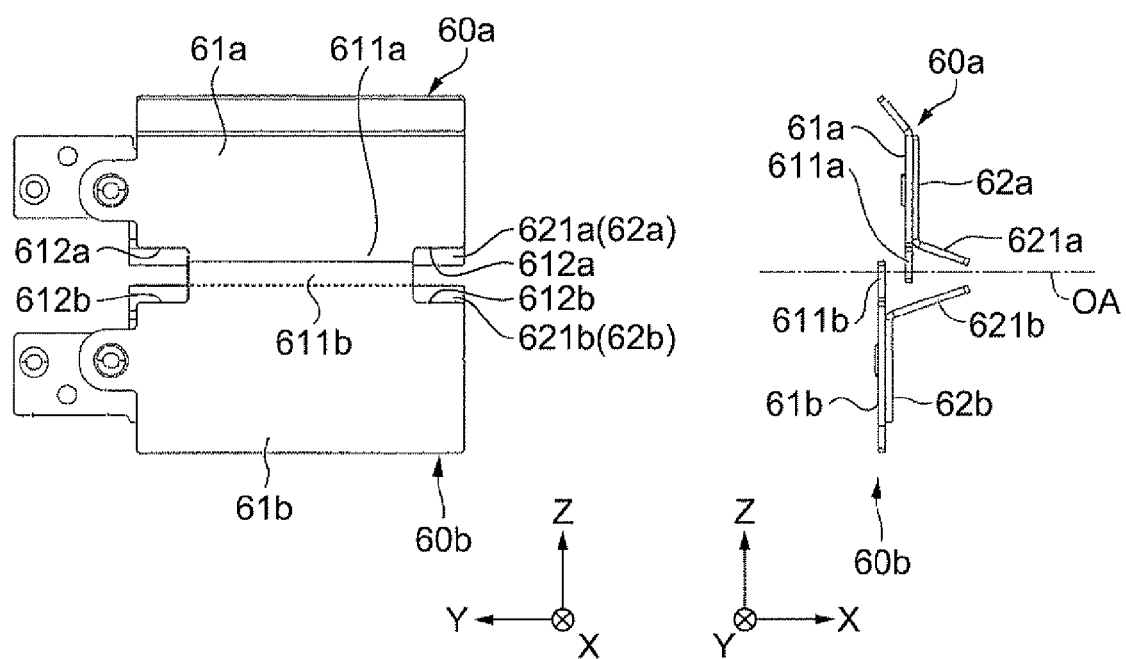
FIGS. 9A and 9B are diagrams showing the configuration of the pair of light blocking sections.
Figure 10:
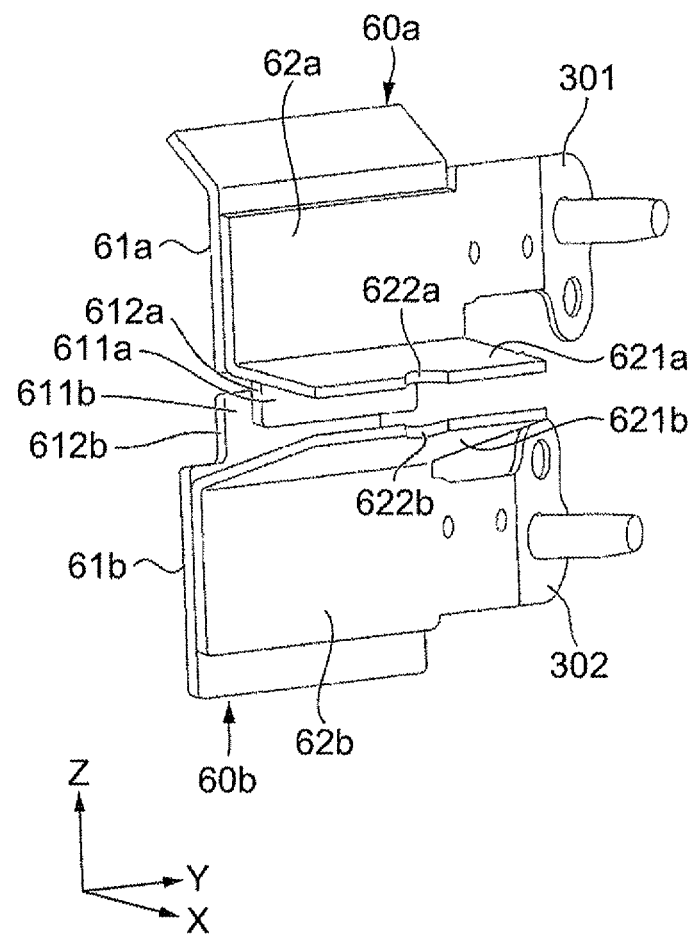
FIG. 10 is a perspective view specifically showing the configuration of the pair of light blocking sections.

FIGS. 7A and 7B are diagrams schematically showing an overall configuration of the dimmer 325. FIG. 7A is a perspective view of the dimmer 325 viewed from the second lens array 322 side. FIG. 7B is a perspective view of the dimmer 325 viewed from the first lens array 321 side. FIG. 8 is a perspective view specifically showing the configuration of the pair of light blocking sections 60a and 60b, wherein the light blocking sections 60a and 60b are viewed from the first lens array 321 side. FIGS. 9A and 9B are diagrams showing the configuration of the pair of light blocking sections 60a and 60b. FIG. 9A is a plan view of the light blocking sections 60a and 60b viewed from the first lens array 321 side. FIG. 9B is a side view of FIG. 9A. FIG. 10 is a perspective view schematically showing the configuration of the pair of light blocking sections 60a and 60b, wherein the light blocking sections 60a and 60b are viewed from the second lens array 322 side.

As shown in FIGS. 7A and 7B, the dimmer 325 includes the pair of light blocking sections 60a and 60b that can partially block a light beam from the light source device 31 and a driving section 329 that causes the pair of light blocking sections 60a and 60b to operate.

The driving section 329 includes a first gear section 361, a second gear section 362, a third gear section 363, a fourth gear section 364, a motor 365 for rotating the fourth gear section 364, and the fixed section body 360 that holds and fixes the gear sections and the motor. The fourth gear section 364 is a driving gear attached to a rotating shaft of the motor 365. The fourth gear section 364 rotates in the clockwise direction or the counterclockwise direction. The first gear section 361, the second gear sections 362, and the third gear sections 363 are driven gears, which rotate following the rotation of the fourth gear section 364. A stepping motor is used as the motor 365. Another motor such as a voice coil motor may be used as the motor 365. Means for transmitting the rotation of the motor 365 is not limited to the fourth gear section 364.

The light blocking section 60a is attached to the fixed section body 360 via the first gear section 361. The light blocking section 60b is attached to the fixed section body 360 via the second gear section 362. The first gear section 361 and the second gear section 362 mesh with each other. The third gear section 363 meshes with the second gear section 362. The third gear section 363 meshes with the fourth gear section 364 coupled to the motor 365. The driving force of the motor 365 is transmitted to the third gear section 363 via the fourth gear section 364. The second gear section 362 and the first gear section 361 rotate and the light blocking sections 60a and 60b move. The light blocking sections 60a and 60b move around pivot axes AX1 and AX2 of the first gear section 361 and the second gear section 362, which cross the optical axis OA, in association with each other.

The dimmer 325 includes a meshing position detection sensor 366 for detecting a meshing position of the first gear section 361 and the second gear section 362. The meshing position detection sensor 366 includes an optical element. The meshing position detection sensor 366 is set in a place where the number of teeth of the second gear section 362 can be detected. The meshing position detection sensor 366 detects the number of teeth of the second gear section 362, whereby a rotation amount of the second gear section 362 is detected. As explained above, the light blocking section 60b moves following the rotation of the second gear section 362 and the light blocking section 60a moves following the rotation of the first gear section 361. In other words, the first gear section 361 rotates according to the rotation amount of the second gear section 362. Therefore, it is possible to control moving positions of the light blocking section 60a and the light blocking section 60b by detecting the rotation amount of the second gear section 362 using the meshing position detection sensor 366.

FIG. 8 and FIGS. 9A and 9B show an arrangement state of the light blocking sections 60a and 60b in a maximum light blocking state. As shown in FIG. 8 and FIGS. 9A and 9B, in the light blocking sections 60a and 60b, in the maximum light blocking state, the positions in the optical axis OA direction of ends 611a and 611b are different from each other. The ends 611a and 611b are arranged to overlap each other in a direction along the optical axis OA.

A state in which the dimmer blocks a light beam to the maximum with the light blocking sections 60a and 60b (a state in which a passing light amount is the smallest) is referred to as fully closed state or maximum light blocking state. This expression is used below as appropriate. A state in which the dimmer 325 does not block a light beam with the light blocking sections 60a and 60b (a state in which the passing light amount is the largest (in this embodiment, a state in which the light beam is not blocked)) is referred to as fully opened state or maximum opened state. This expression is used below as appropriate.

The light blocking sections 60a and 60b respectively include two tabular first light blocking members 61a and 61b and two tabular second light blocking members 62a and 62b. The first light blocking members 61a and 61b and the second light blocking members 62a and 62b are stuck together to correspond to each other, whereby the light blocking sections 60a and 60b are formed in a desired shape. The light blocking sections 60a and 60b are formed of aluminum plates.

Specifically, the light blocking section 60a includes the first light blocking member 61a and the second light blocking member 62a stuck to an illumination light emission side (a surface on the second lens array 322 side) of the first light blocking member 61a. An end 621a of the second light blocking member 62a inclines with respect to the first light blocking member 61a that extends in a direction substantially orthogonal to the optical axis OA in the maximum light blocking state. Specifically, the end 621a inclines in a direction further away from the first light blocking member 61a toward the distal end side of the end 621a.

The light blocking section 60b includes the first light blocking member 61b and the second light blocking member 62b stuck to an illumination light emission side (a surface on the second lens array 322 side) of the first light blocking member 61b. An end 621b of the second light blocking member 62b inclines with respect to the first light blocking member 61b that extends in a direction substantially orthogonal to the optical axis OA in the maximum light blocking state. Specifically, the end 621b inclines in a direction further away from the first light blocking member 61b toward the distal end side of the end 621b.

The ends 621a and 621b arranged to be opposed to each other at a predetermined distance across the optical axis OA incline to come closer to the optical axis OA as the ends 621a and 621b are further away from the first light blocking members 61a and 61b along the optical axis OA. Distances from the distal ends of the ends 621a and 621b to the optical axis OA are equal to each other. Distances between the distal ends of the ends 621a and 621b and the second lens array 322 are also equal to each other. Consequently, during the rotation of the light blocking sections 60a and 60b, light blocking positions at the ends 621a and 621b are the same positions symmetrical via the optical axis OA. Therefore, a desired illuminance distribution is obtained.

The light blocking section 60a and the light blocking section 60b in this embodiment shift from each other in a direction in which the light blocking sections are away from each other along the optical axis OA direction. The light blocking section 60b is arranged in a position further away from the second lens array 322 than the light blocking section 60a. In order to equalize distances between the distal ends of the ends 621a and 621b and the second lens array 322, the end 621b of the light blocking section 60b located on the front side in the optical axis OA direction (the first lens array 321 side) is set longer than the end 621a of the light blocking section 60a.

At the ends 611a and 611b of the first light blocking members 61a and 61b, first cutout sections 612a and 612b are respectively formed on width direction both end sides of the ends. The first cutout sections 612a and 612b are cutout sections for preventing irradiated light from the light source device 31 from being completely blocked in the maximum light blocking state. A part of the irradiated light is emitted as leak light through the first cutout sections 612a and 612b.

Further, as shown in FIG. 10, at the distal ends of the ends 621a and 621b of the second light blocking members 62a and 62b, arcuate second cutout sections 622a and 622b are respectively formed in width direction center portions of the distal ends. The second cutout sections 622a and 622b are cutout sections for controlling a light blocking amount on the light beam center side of illumination light emitted from the light source device 31.

In other words, from the maximum opened state (the fully opened state) to the maximum light blocking state (the fully closed state), the light blocking section 60a functions to perform adjustment of a light blocking amount on the light beam center side with the second cutout section 622a formed in the second light blocking member 62a. In the maximum light blocking state, the light blocking section 60a functions to adjust a light blocking amount around the light beam with the first cutout section 612a while maximizing a light blocking amount in the light beam center with the first light blocking member 61a.

Similarly, from the fully opened state to the maximum light blocking state, the light blocking section 60b functions to perform adjustment of a light blocking amount on the light beam center side with the second cutout section 622b formed in the second light blocking member 62b. In the maximum light blocking state, the light blocking section 60b functions to adjust a light blocking amount around the light beam with the first cutout section 612b while maximizing a light blocking amount in the light beam center with the first light blocking member 61b.

The light blocking section 60a having such a configuration is coupled to the first gear section 361 via the coupling member 301. The light blocking section 60b is coupled to the second gear section 362 via the coupling member 302.

Figure 11:
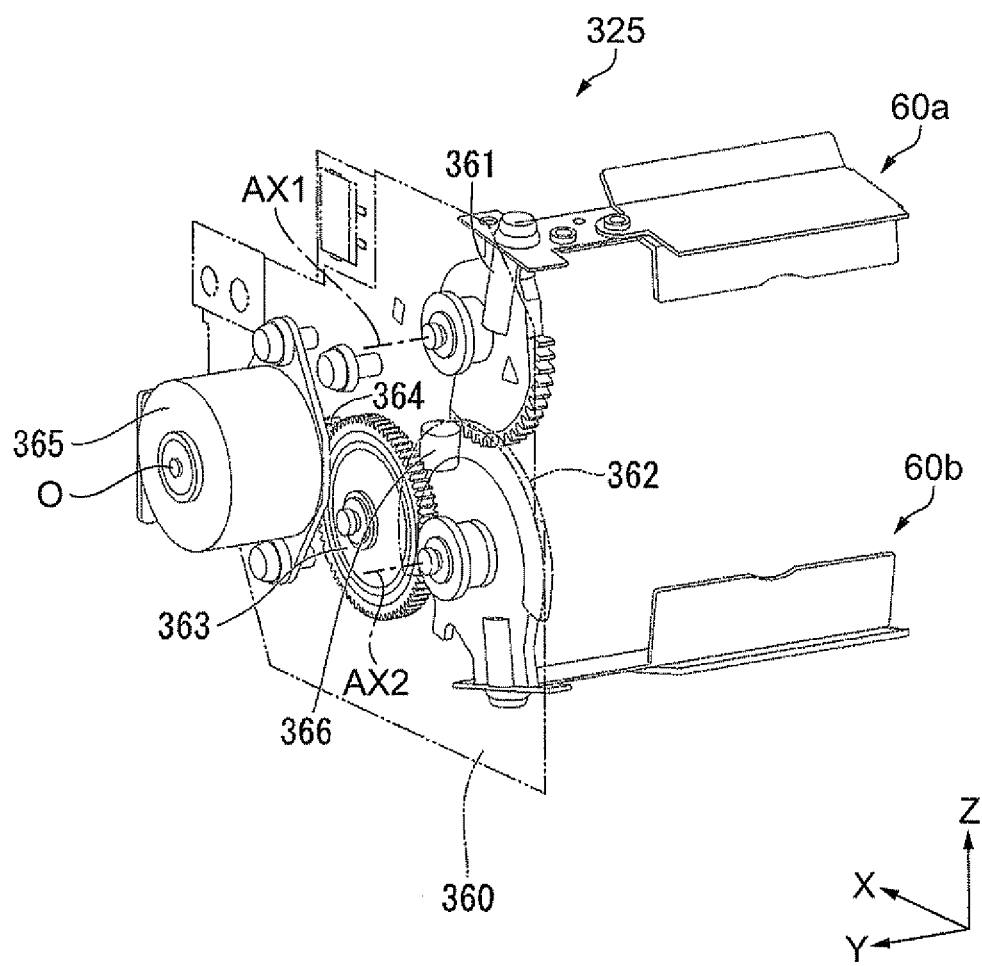
FIG. 11 is a perspective view for explaining the operation of the dimmer.
Figure 12:
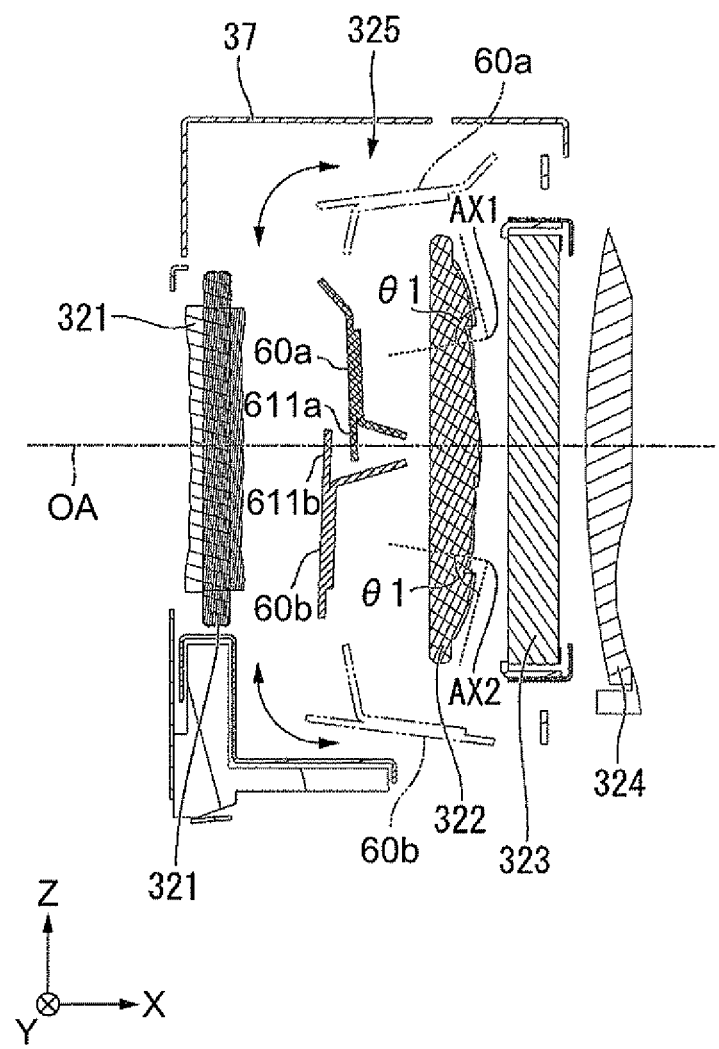
FIG. 12 is a sectional view showing the operation of the dimmer.

FIG. 11 is a perspective view for explaining the operation of the dimmer 325. FIG. 12 is a sectional view showing the operation of the dimmer 325.

As shown in FIG. 11, the rotation of the motor 365 of the dimmer 325 is transmitted to the third gear section 363 via the fourth gear section 364 connected to a pivot support shaft O of the motor 365. The second gear section 362 and the first gear section 361 rotate following the rotation of the third gear 363. At this point, the first gear section 361 and the second gear section 362 rotate in opposite directions in synchronization with each other. Consequently, the dimmer 325 can open and close the light blocking section 60a and the light blocking section 60b in the center in synchronization with each other. When opened and closed, the light blocking sections 60a and 60b change a state thereof to the fully opened state and the fully closed state according to the normal rotation or the reverse rotation of the motor 365.

For example, as shown in FIG. 12, the light blocking sections 60a and 60b change to the maximum light blocking state and the maximum opened state according to a pivot action of the first gear section 361 and the second gear section 362 about the pivot axes AX1 and AX2. Specifically, in the maximum light blocking state indicated by a solid line in the figure, the light blocking sections 60a and 60b are substantially parallel to the second lens array 322 and the ends 611a and 611b lie side by side on the optical axis OA. In the maximum opened state indicated by an alternate long and short dash line in the figure, the light blocking sections 60a and 60b rotate a predetermined pivot angle θ1 (about 90°) from the fully closed state in which the light blocking sections 60a and 60b are substantially parallel to the second lens array 322. The ends 611a and 611b are located outside an optical path of illumination light (outside an effective range) and do not block the illumination light.

Although not shown in the figure, as an intermediate stage, the light blocking sections 60a and 60b rotate a predetermined pivot angle θ2 (0°<θ2<θ1) compared with the fully closed state in which the light blocking sections 60a and 60b are substantially parallel to the second lens array 322. The ends 611a and 611b separate from the optical axis OA a certain degree and block a part of the illumination light.

The operation of the dimmer 325 is specifically explained.

Figure 13A:
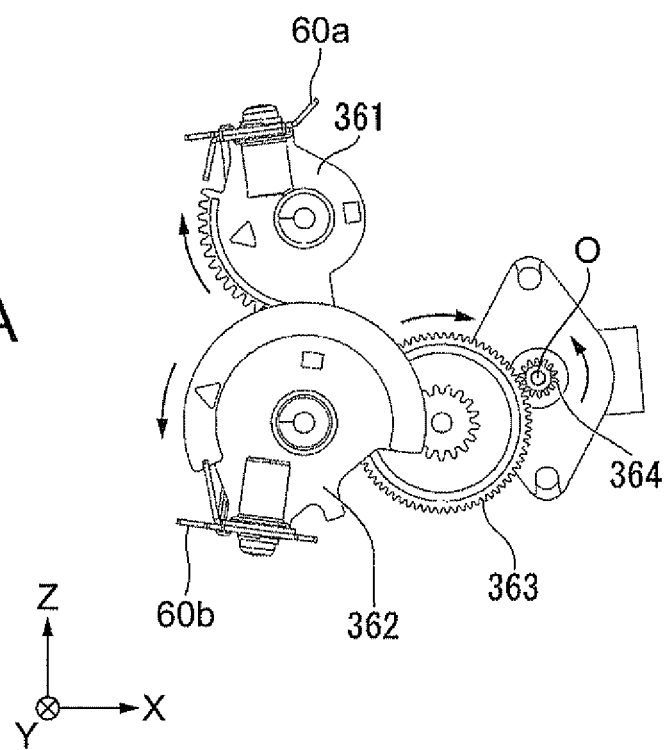
FIGS. 13A and 13B are diagrams showing a maximum opened state.
Figure 13B:
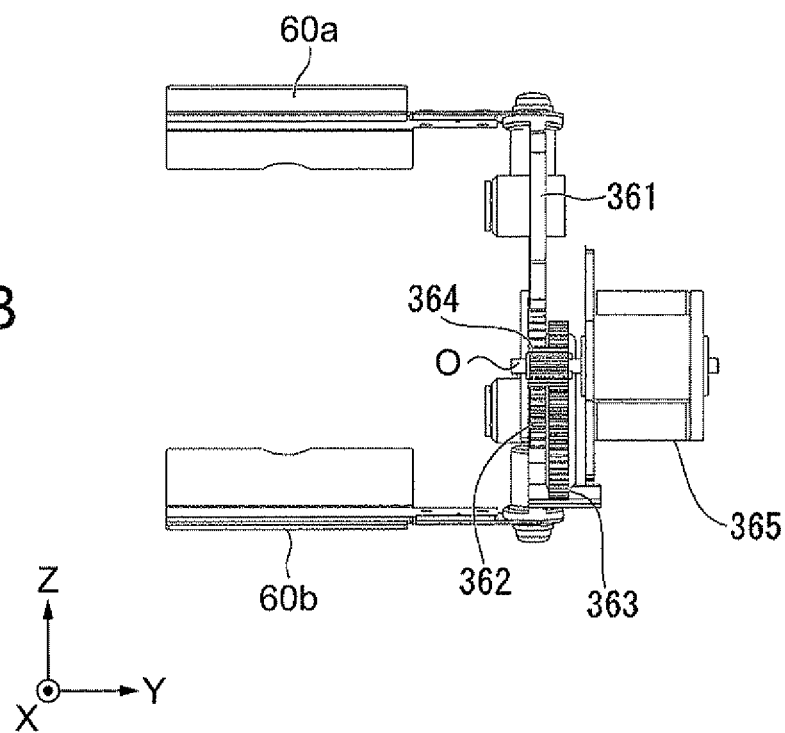
Figure 14A:
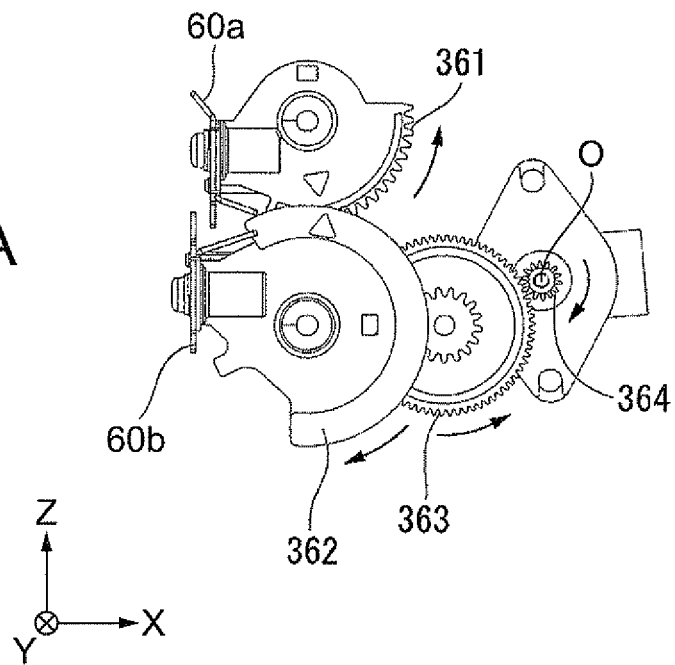
FIGS. 14A and 14B are diagrams showing a maximum light blocking state.
Figure 14B:
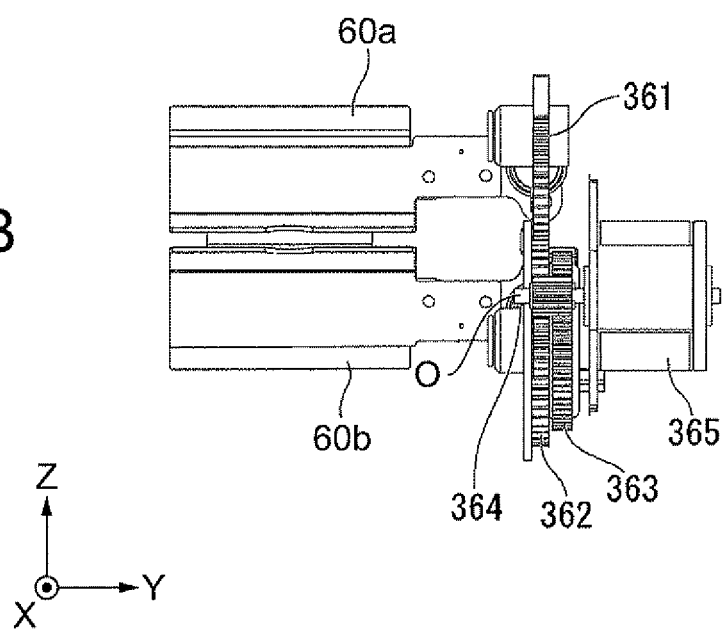

FIGS. 13A and 13B are diagrams showing the maximum opened state (the fully opened state). FIG. 13A is a side view of the dimmer 325 and FIG. 13B is a plan view of the dimmer 325 viewed from the second lens array 322 side. FIGS. 14A and 14B are diagrams showing the maximum light blocking state (the fully closed state). FIG. 14A is a side view of the dimmer 325 and FIG. 14B is a plan view of the dimmer 325 viewed from the second lens array 322 side.

When the light blocking sections 60a and 60b are moved from the maximum light blocking state to the maximum opened state, as shown in FIGS. 13A and 13B, when the motor 365 rotates counterclockwise, the fourth gear section 364 rotates in the same direction as the rotation of the motor 365 and the third gear section 363 rotates clockwise. Since the second gear section 362 rotates counterclockwise in synchronization with the third gear section 363, the first gear section 361 rotates clockwise following the rotation of the second gear section 362. Consequently, the light blocking sections 60a and 60b change to the fully opened state in which the light blocking sections 60a and 60b are most apart from each other.

When the light blocking sections 60a and 60b are shifted from the maximum opened state to the maximum light blocking state, as shown in FIGS. 14A and 14B, when the motor 365 rotates clockwise, the fourth gear section 364 rotates in the same direction following the rotation of the motor 365 and the third gear section 363 rotates counterclockwise. The second gear section 362 rotates clockwise in synchronization with the third gear section 363 and the first gear section 361 rotates counterclockwise following the rotation of the second gear section 362. Consequently, the light blocking sections 60a and 60b come closest to each other, partially overlap each other in a position coinciding with the optical axis OA, and change to the maximum light blocking state.

A change in a light blocking region due to the dimmer 325 is explained.

Figure 15:
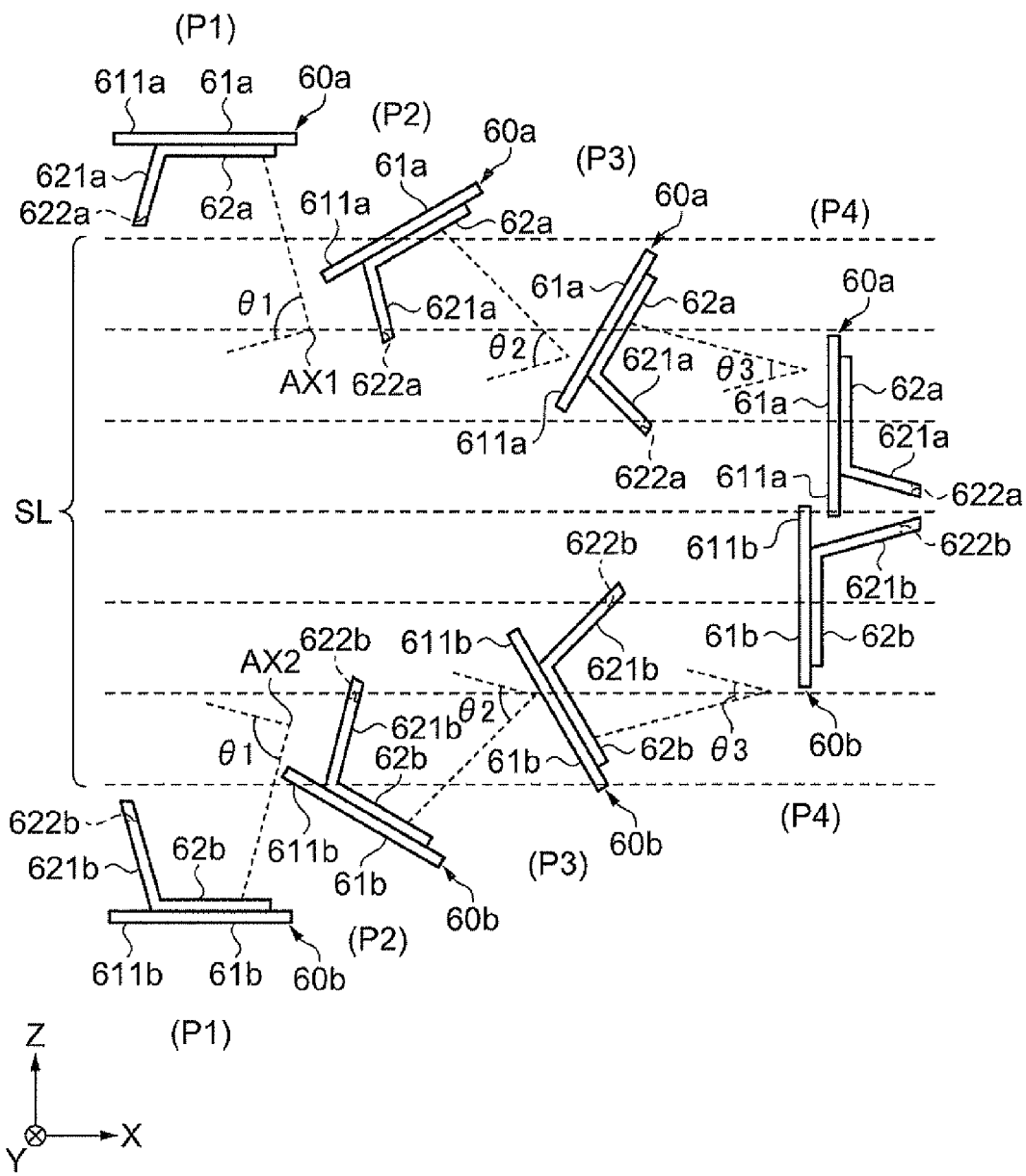
FIG. 15 is a conceptual diagram for explaining a change in a light blocking amount due to the operation of the dimmer.

FIG. 15 is a conceptual diagram for explaining a change in a light blocking amount (a passing light amount) due to the operation of the dimmer 325.

As shown in FIG. 15, the dimmer 325 causes the light blocking sections 60a and 60b to pivot as indicated by patterns P1 to P4 to change a light blocking region of a light beam of illumination light SL from the light source 311 and perform dimming of the illumination light SL. The pattern P1 indicates the fully opened state (a state in which a pivot angle is about 90°). The pattern P4 indicates the fully closed state (a state in which the pivot angle is about 0°). The patterns P1 to P4 indicate a difference in a light blocking state due to a rotation angle θ (0°<θ3<θ2<θ1 (90°)).

In the case of the pattern 21 (the maximum opened state), a value of the pivot angle θ1 is 90°. The light blocking sections 60a and 60b are arranged in positions where the light blocking sections 60a and 60b do not block a light beam from the light source 311. In this case, all components of the light beam emitted from the light source 311 are allowed to pass through the light blocking sections 60a and 60b and used as the illumination light SL.

When the light blocking sections 60a and 60b are rotated and changed to the state of the pattern 22 to increase the light blocking region from the fully opened state, first, a part of the illumination light SL is blocked by the ends 621a and 621b of the second light blocking members 62a and 62b. When a part of the illumination light SL is blocked, light on the center side of the illumination light SL is transmitted through the second cutout sections 622a and 622b of the second light blocking members 62a and 62b.

When the light blocking sections 60a and 60b are further rotated and changed to the state of the patter 23, in which the light blocking sections 60a and 60b are further closed than the state of the pattern 22, to further increase the light blocking region, the illumination light SL is further blocked by the first light blocking members 61a and 61b and the second light blocking members 62a and 62b (the ends 621a and 621b). When the illumination light SL is blocked, a part of the light on the center side of the illumination light SL is transmitted through the second cutout sections 622a and 622b while being blocked by the first light blocking members 61a and 61b.

When the light blocking sections 60a and 60b are closed and changed to the pattern P4 (the maximum light blocking state), the illumination light SL is blocked by the first light blocking members 61a and 61b. When the illumination light SL is blocked, the illumination light SL is not entirely blocked by the first light blocking members 61a and 61b. The light on the center side of the illumination light SL is blocked by the ends 611a and 611b. However, a part of light in the periphery of the illumination light SL is transmitted to leak from the pair of first cutout sections 612a and 612b (FIG. 9B) provided on both the end sides of the ends 611a and 611b.

In this way, when the light blocking sections 60a and 60b are in the maximum light blocking state, the light on the center side of the illumination light SL is blocked and a part of the light in the periphery of the illumination light SL is transmitted. This contributes to improvement of contrast.

According to the embodiment explained above, effects explained below are obtained.

In the dimmer 325 according to this embodiment, the opposed ends 611a and 611b on the optical axis OA side of the pair of light blocking sections 60a and 60b are arranged in the direction along the optical axis OA to overlap each other in the maximum light blocking state. Consequently, it is possible to block a light beam from the light source 311. In particular, the center side having high luminance of the light beam is blocked to suppress color unevenness.

In the dimmer 325 according to this embodiment, the first cutout sections 612a and 612b are provided on both the end sides of the ends 611a and 611b on the optical axis OA side of the pair of light blocking sections 60a and 60b. Consequently, in the maximum light blocking state, the pair of light blocking sections 60a and 60b can block a light beam from the light source 311 with the ends 611a and 611b, which overlap each other, and can leak a part of the light beam with the first cutout sections 612a and 612b. In other words, the pair of light blocking sections 60a and 60b can block the light on the center side having the highest luminance of the illumination light SL and allow the light on the peripheral side having relatively low luminance to pass and can make the light incident on the second lens array 322. Consequently, when the dimmer 325 is built in the projector 1, it is possible to form a high-contrast image.

In the dimmer 325 according to this embodiment, the pair of light blocking sections 60a and 60b include the first light blocking members 61a and 61b formed to extend in the direction substantially orthogonal to the optical axis OA in the maximum light blocking state and the second light blocking members 62a and 62b formed on the optical path downstream side of a light beam with respect to the first blocking members 61a and 61b to incline with respect to the first light blocking members 61a and 61b such that the distal end sides thereof separate from the first light blocking members 61a and 61b. Consequently, when the pair of light blocking sections 60a and 60b rotate, it is possible to make a change in a light blocking amount relatively gentle by blocking the light beam not only in the first light blocking members 61a and 61b but also in the second light blocking members 62a and 62b. It is possible to sufficiently reduce an illumination light amount in the maximum light blocking state.

In the dimmer 325 according to this embodiment, the first cutout sections 612a and 612b are provided in the first light blocking members 61a and 61b. The second cutout sections 622a and 622b are provided in the centers of the opposed distal ends on the optical axis OA side of the second light blocking members 62a and 62b. With this configuration, it is possible to make a change in a light blocking amount relatively gentle and suppress color unevenness by leaking light from the second cutout sections 622a and 622b of the second light blocking members 62a and 62b.

In this embodiment, an extinction amount is different on the center side close to the optical axis OA and the peripheral side far from the optical axis OA because of the second cutout sections 622a and 622b. Therefore, a linear contour is not formed in a boundary portion between a light blocking region and an irradiation region. It is possible to gently extinguish light according to the size of a pivot angle by the pivot action of the light blocking sections 60a and 60b.

Concerning the number of small lenses 322a of the second lens array 322 in this embodiment, an odd number of small lenses 322a is arranged in a direction in which the light blocking sections 60a and 60b of the dimmer 325 open and close. In this case, as in the past, in the configuration in which the pair of light blocking sections are in the same position on the optical axis OA, even if the pair of light blocking sections are closed, since a part of the illumination light SL (in particular, light in the center having the highest luminance) from the light source device 31 is made incident on the small lens 322a in the center of the second lens array 322 from a gap of the pair of light blocking sections, it is difficult to improve contrast. Therefore, a lens array in which an even number of small lenses 322a is arranged to prevent the center of the small lenses 322a from being opposed to the gap is often used as the second lens array 322.

On the other hand, in the dimmer 325 according to this embodiment, the pair of light blocking sections 60a and 60b are arranged side by side (arranged in different positions) along the optical axis OA and the ends 611a and 611b of the first light blocking members 61a and 61b overlap each other in the fully closed state. Therefore, it is possible to block light in the center having the highest luminance in the illumination light SL. Consequently, irrespective of whether the number of small lenses 322a of the second lens array 322 is an odd number or an even number, it is possible to form a high-contrast image with color unevenness suppressed.

With the dimmer 325 according to this embodiment, it is possible to inexpensively manufacture the light blocking sections 60a and 60b and the peripheral structure thereof with a simple configuration. Therefore, it is possible to realize the high-performance projector 1 that can project a high-contrast display image at reduced costs.

Second Embodiment

Figure 16A:
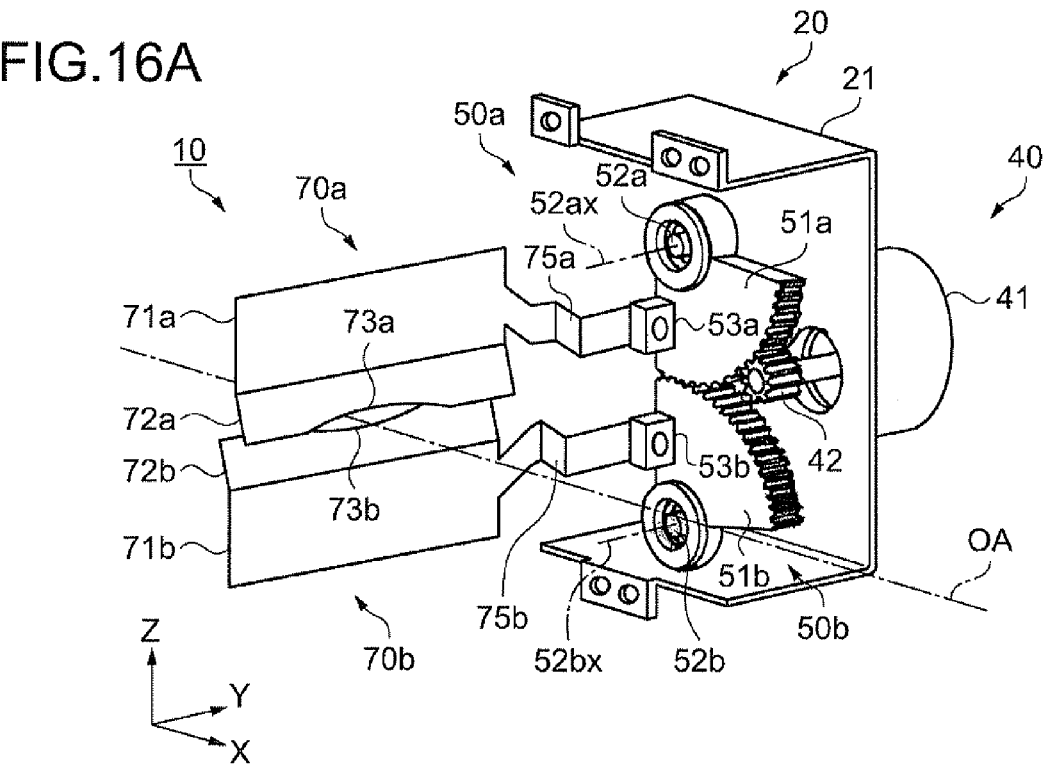
FIGS. 16A and 16B are diagrams showing a schematic configuration of a dimmer according to a second embodiment.
Figure 16B:
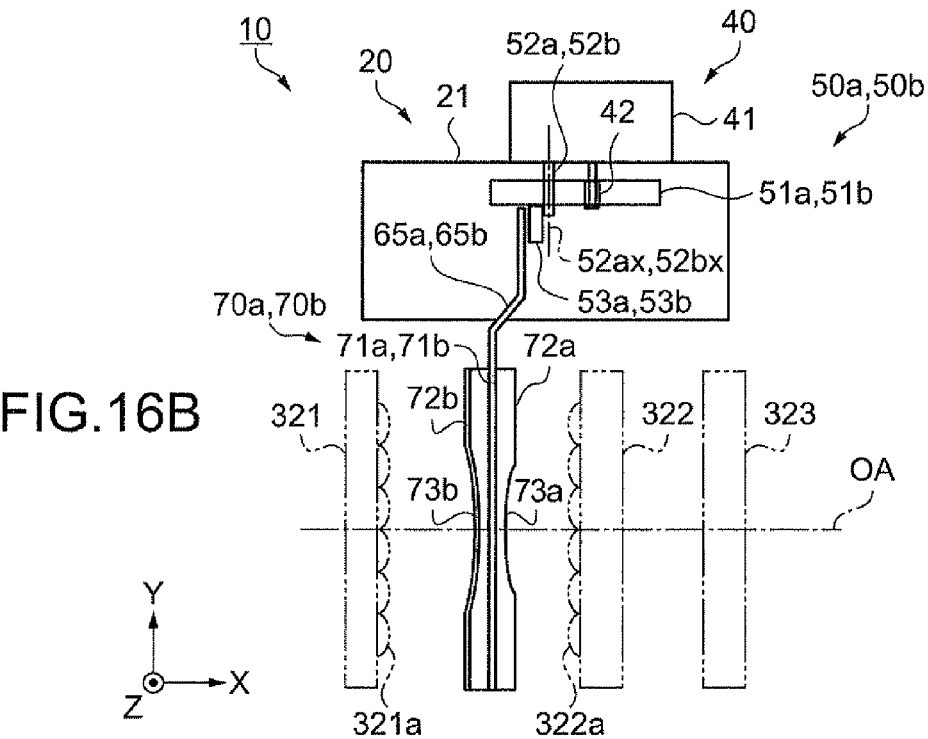
Figure 17B:
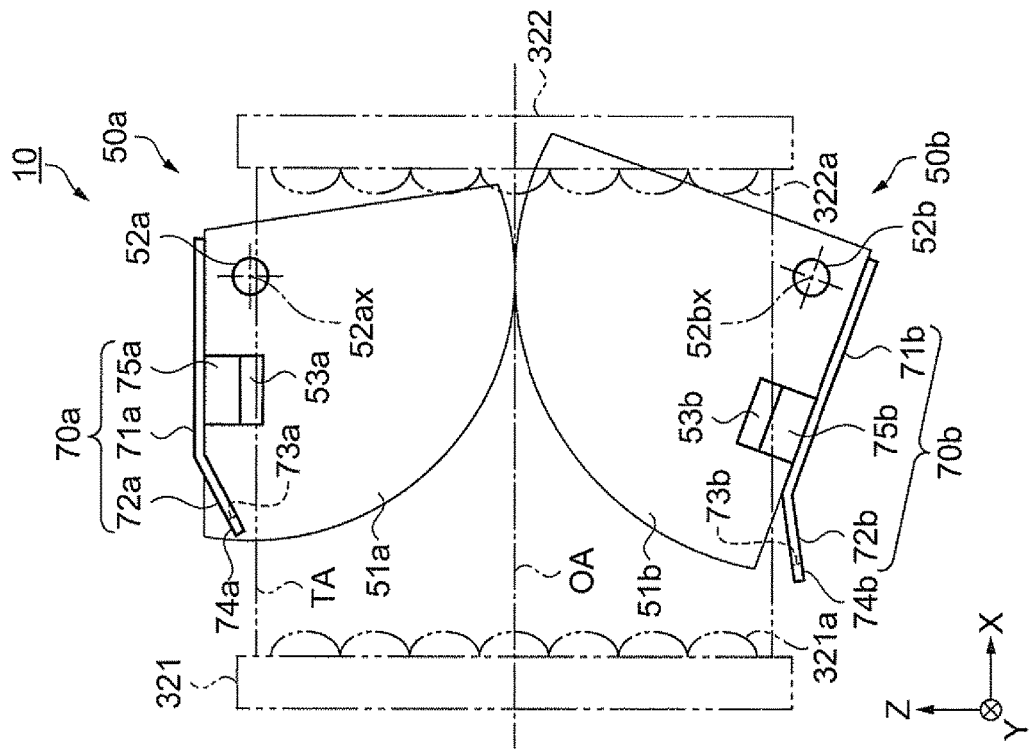
FIGS. 17A and 17B are diagrams showing operating ranges of light blocking sections in the dimmer.
Figure 17A:
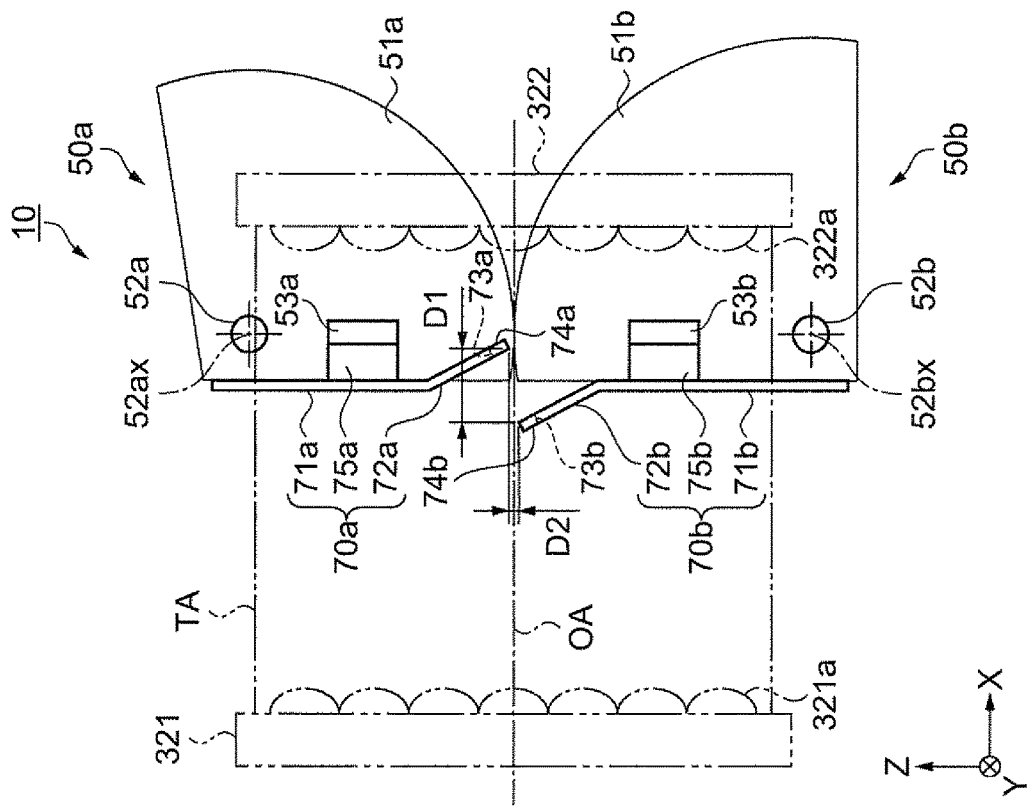

FIGS. 16A and 16B are diagrams showing a schematic configuration of a dimmer 10 according to a second embodiment. FIG. 16A is a perspective view of the dimmer 10 viewed from the X direction distal end side. FIG. 16B is a plan view of the dimmer 10 viewed from a Z direction distal end side. Both the FIGS. 16A and 16B show the maximum light blocking state. FIGS. 17A and 17B are diagrams showing operating ranges of light blocking sections 70a and 70b in the dimmer 10. FIG. 17A is a diagram showing the positions of the light blocking sections 70a and 70b in the maximum light blocking state. FIG. 17B is a diagram showing the positions of the light blocking sections 70a and 70b in the maximum opened state. The configuration and the operation of the dimmer 10 are explained with reference to FIGS. 16A and 16B and FIGS. 17A and 17B.

The projector 1 according to this embodiment is different from the projector 1 according to the first embodiment in the configuration of the dimmer 325 (in this embodiment, the dimmer 10). Whereas the small lenses 322a of the second lens array 322 are formed on the light beam emission side in the first embodiment, in this embodiment, the small lenses 322a are formed on the light source 311 side. The operation of the projector 1 according to this embodiment is the same as the operation of the projector according to the first embodiment. Otherwise, the projector 1 according to this embodiment is configured the same as the projector 1 according to the first embodiment. Components same as those in the first embodiment are denoted by the same reference numerals and signs.

As shown in FIGS. 16A and 16B, the dimmer 10 includes a fixed section 20, a driving mechanism section 40, a pair of pivoting sections 50a and 50b, and a pair of light blocking sections 70a and 70b.

The fixed section 20 includes a fixed section body 21. The fixed section 20 is attached and fixed to the optical component housing 37 (FIGS. 2 and 3). The fixed section body 21 is formed of a sheet metal or the like. Although not shown in the figure, the fixed section body 21 includes an attaching section for attaching the fixed section body 21 to the optical component housing 37 and an opening section, a bearing section, and the like for supporting the driving mechanism section 40 and the pivoting sections 50a and 50b.

The driving mechanism section 40 includes a motor 41 and a gear 42 that transmits the rotation of the motor 41 to the pivoting sections 50a and 50b. The motor 41 is fixed on a Y direction distal end side of the fixed section body 21. The gear 42 is arranged on a Y direction proximal end side of the fixed section body 21. The motor 41 is controlled by the control section 24 to generate a driving force for rotating the gear 42. As the motor 41, a stepping motor is used as in the first embodiment.

The pivoting section 50a and 50b includes gears 51a and 51b, pivot support shafts 52a and 52b, and holding sections 53a and 53b that hold light blocking sections 70a and 70b explained below. The gears 51a and 51b are set to dimensions corresponding to operating ranges of the light blocking sections 70a and 70b. The gears 51a and 51b have a substantially quarter-circular shape when viewed from the Y direction. Pivot axes 52ax and 52bx, which are center axes of the pivot support shafts 52a and 52b, are arranged along the Y direction, which is a direction substantially orthogonal to the optical axis OA.

Correspondence between the configuration of the dimmer 325 according to the first embodiment explained above (FIGS. 7A and 7B) and the configuration of the dimmer 10 according to this embodiment (FIGS. 16A and 16B) is explained below. The fixed section body 360 included in the driving section 329 in the first embodiment corresponds to the fixed section 20 in this embodiment. The motor 365, the fourth gear section 364, and the third gear section 363 included in the driving section 329 in the first embodiment correspond to the driving mechanism section 40 in this embodiment. The first gear section 361, the second gear section 362, and the pivot axes AX1 and AX2 included in the driving section 329 in the first embodiment correspond to the pair of pivoting sections 50a and 50b in this embodiment. Specifically, the first gear section 361 and the second gear section 362 correspond to the gears 51a and 51b. The pivot axes AX1 and AX2 correspond to the pivot axes 52ax and 52bx. The pair of light blocking sections 60a and 60b in the first embodiment correspond to the pair of light blocking sections 70a and 70b in this embodiment.

Referring back to FIGS. 16A and 16B, the gears 51a and 51b are supported by the fixed section body 21 via the pivot support shafts 52a and 52b. The gears 51a and 51b can pivot about the pivot axes 52ax and 52bx. The gears 51a and 51b mesh with each other. One of the gears 51a and 51b (in this embodiment, the gear 51a) meshes with the gear 42. When the rotation of the motor 41 is transmitted to the gears 51a and 51b via the gear 42, the gears 51a and 51b pivot at high speed in opposite directions in synchronization with each other. The holding sections 53a and 53b are provided in positions deviating from the pivot support shafts 52a and 52b on surfaces on the Y direction proximal end side of the gears 51a and 51b.

The gears 51a and 51b have the same teeth shape. However, in order to set the light blocking sections 70a and 70b in a positional relation shown in FIGS. 17A and 17B, the diameters of the gears 51a and 51b are set different. In this embodiment, the diameter of the gear 51b is formed slightly larger than the diameter of the gear 51a.

The light blocking sections 70a and 70b are arranged to be opposed to each other across the optical axis OA. The light blocking sections 70a and 70b are held by the pivoting sections 50a and 50b and formed to extend substantially perpendicularly to the optical axis OA (substantially parallel to the pivot axes 52ax and 52bx). One light blocking section 70a is arranged on the Z direction distal end side and the other light blocking section 70b is arranged on a Z direction proximal end side. The light blockings sections 70a and 70b are set between the first lens array 321 and the second lens array 322 and configured to be inserted from the Y direction distal end side of the optical component housing 37 (FIG. 16B).

In this embodiment, the light blocking sections 70a and 70b are tabular members that extend along the direction of the pivot axes 52ax and 52bx, i.e., the Y direction. The light blocking sections 70a and 70b are formed by sheet metal pressing or the like. The light blocking sections 70a and 70b include third light blocking members 71a and 71b, fourth light blocking members 72a and 72b, and supporting sections 75a and 75b.

As shown in FIGS. 16A and 17A, the light blocking section 70a includes the third light blocking member 71a formed on the YZ plane substantially perpendicular to the optical axis OA in the maximum light blocking state and the fourth light blocking member 72a extending from the distal end on the optical axis OA side of the third light blocking member 71a and formed to bend along the optical axis OA. Similarly, the light blocking section 70b includes the third light blocking member 71b formed on the YZ plane substantially the same as the third light blocking member 71a in the maximum light blocking state and the fourth light blocking member 72b extending from the distal end on the optical axis OA side of the third light blocking member 71b and formed to bend along the optical axis OA.

As shown in FIGS. 16A and 17A, specifically, one fourth light blocking member 72a is formed to incline to bend from the distal end on the optical axis OA side of the third light blocking member 71a to the optical path downstream side (the second lens array 322 side) of a light beam. Specifically, the other fourth light blocking member 72b is formed to incline to bend from the distal end on the optical path OA side of the third light blocking member 71b to the optical path upstream side (the first lens array 321 side) of the light beam. In other words, positions in the direction along the optical axis OA of opposed ends 74a and 74b on the optical axis OA side of the fourth light blocking members 72a and 72b are different from each other. When viewed from the Y direction, one end 74a is located on the optical path downstream side and the other end 74b is located on the optical path upstream side. Unlike the first embodiment, the ends 74a and 74b are not configured to overlap each other in the direction along the optical axis OA.

As shown in FIGS. 16A and 17A, arcuate (in this embodiment, substantially bow-shaped) third cutout sections 73a and 73b symmetrical with respect to the XZ plane passing the optical axis OA are provided at the ends 74a and 74b of the fourth light blocking members 72a and 72b with the optical axis OA set in substantially the center. The sizes of the third cutout sections 73a and 73b are set different from each other. In this embodiment, one third cutout section 73b is formed larger than the other third cutout section 73a. The sizes of the third cutout sections 73a and 73b are determined such that passing light amounts of light passing the third cutout sections 73a and 73b are equal when an opening area viewed from the X direction changes.

The supporting sections 75a and 75b are tabular narrower in the Z direction than the third light blocking members 71a and 71b. The supporting sections 75a and 75b extend from the third light blocking members 71a and 71b to the Y direction distal end side. The supporting sections 75a and 75b bend to the X direction side in the intermediate portions in the extending direction. The supporting sections 75a and 75b are fixed to the holding sections 53a and 53b at the distal ends in the extending direction. The dimmer 10 holds the light blocking sections 70a and 70b with a cantilever structure for supporting one end sides (the supporting sections 75a and 75b) of the third light blocking members 71a and 71b.

In FIGS. 17A and 17B, the first lens array 321 and the second lens array 322 and a passing region TA where a light beam passes between the first lens array 321 and the second lens array 322 are indicated by alternate long and two short dashes lines. The passing region TA corresponds to the illumination light SL in the first embodiment. The illumination light SL passes through the passing region TA.

The first lens array 321 and the second lens array 322 are parallel to each other and arranged to be substantially orthogonal to the optical axis OA. Since the fixed section 20, the driving mechanism section 40, and the pivoting sections 50a and 50b are set on the outer side of the passing region TA, the fixed section 20, the driving mechanism section 40, and the pivoting sections 50a and 50b do not block a light beam.

As shown in FIG. 17A, when the light blocking sections 70a and 70b are in the maximum light blocking state, the ends 74a and 74b of the fourth light blocking members 72a and 72b are respectively located on the optical path downstream side and the optical path upstream side as explained above when viewed from the Y direction. Therefore, the ends 74a and 74b have a separation distance D1 therebetween in the X direction (the direction along the optical axis OA). The separation distance D1 is set and secured as a distance necessary for preventing the fourth light blocking members 72a and 72b from interfering with each other according to the pivoting of the light blocking sections 70a and 70b when fluctuation in machining accuracy of the light blocking sections 70a and 70b and assembly accuracy of the dimmer 10 is taken into account.

As shown in FIG. 17A, when the light blocking sections 70a and 70b are in the maximum light blocking state, the ends 74a and 74b have a separation distance D2 at which the ends 74a and 74b nearly overlap each other in a plane (the YZ plane) perpendicular to the optical axis OA when viewed from the X direction. Therefore, the ends 74a and 74b in the Z direction have the separation distance D2 therebetween. The separation distance D2 is set small compared with the past. The portions of the third cutout sections 73a and 73b sometimes slightly increase a passing light amount. However, since the separation distance D2 is set small compared with the past, in the case of the maximum light blocking state, it is possible to suppress the passing light amount as a whole compared with the past and improve an extinction ratio.

To change the light blocking sections 70a and 70b from the maximum light blocking state to the maximum opened state as shown in FIG. 17B, the pivoting sections 50a and 50b are caused to pivot according to the pivoting of the gear 42. The light blocking sections 70a and 70b rotate in the up down direction to open in the center about the pivot axes 52ax and 52bx following the pivoting of the pivoting sections 50a and 50b. The light blocking sections 70a and 70b are located on the outer side of the passing region TA to stop. In the case of the maximum opened state, the light blocking sections 70a and 70b do not block the passage of a light beam.

Between the maximum light blocking state and the maximum opened state, a pivot angle of the light blocking sections 70a and 70b changes according to the pivoting of the pivoting sections 50a and 50b, whereby a light blocking region of a light beam by the light blocking sections 70a and 70b changes according to the pivot angle. The pivot angle of the light blocking sections 70a and 70b changes, whereby an opening area viewed from the X direction of the third cutout sections 73a and 73b having the substantially bow-shaped contour changes according to the pivot angle.

According to the embodiment explained above, effects explained below are obtained.

In the dimmer 10 according to this embodiment, the light blocking sections 70a and 70b include the third light blocking members 71a and 71b and the fourth light blocking members 72a and 72b. In the maximum light blocking state, the separation distance D1 is secured by setting the opposed ends 74a and 74b on the optical axis OA side of the fourth light blocking members 72a and 72b in the different positions in the direction along the optical axis OA. Consequently, it is possible to maintain a separation distance at which fluctuation in machining accuracy of the light blocking sections 70a and 70b and assembly accuracy of the dimmer 10 can be allowed. Since it is possible to set the separation distance D2 between the ends 74a and 74b as small as possible in the plane perpendicular to the optical axis OA, it is possible to improve an extinction ratio compared with the past.

In the dimmer 10 according to this embodiment, one fourth light blocking member 72a is formed to bend to the optical path downstream side and the other fourth light blocking member 72b is formed to bend to the optical path upstream side. Therefore, the opposed ends 74a and 74b on the optical axis side can be set in the different positions in the direction along the optical path OA. With this configuration, it is possible to form the fourth light blocking members 72a and 72b in a simple shape. Further, it is possible to accomplish the effects explained above.

In the dimmer 10 according to this embodiment, the third cutout sections 73a and 73b having the substantially bow-shaped contour are provided at the ends 74a and 74b on the optical path OA side of the pair of light blocking sections 70a and 70b. The opening area viewed from the X direction of the third cutout sections 73a and 73b changes according to a pivot angle. Therefore, it is possible to suppress a sudden change in a passing light amount and make a change in the passing light amount gentle. Further, it is possible to suppress occurrence of color unevenness.

In the dimmer 10 according to this embodiment, the sizes of the opposed third cutout sections 73a and 73b are set different to correspond to the positions of the ends on the optical axis side of the opposed light blocking sections 70a and 70b set different in the direction along the optical axis OA. Therefore, it is possible to make a change in the passing light amount gentler. Further, it is possible to further suppress occurrence of color unevenness.

In the projector 1 according to this embodiment, a light beam emitted from the light source device 31 can be adjusted by improving an extinction ratio with the dimmer 10. The adjusted light beam is modulated by the light modulating device (the liquid crystal light valve 352) according to an image signal to form image light. Consequently, it is possible to further improve contract of the formed image light than in the past. It is possible to make a change in the passing light amount gentle with the third cutout sections 73a and 73b of the dimmer 10. Therefore, it is possible to suppress a sudden change in the brightness of the image light and suppress color unevenness.

In the first lens array 321 in this embodiment, the small lenses 321a are arrayed in an odd number of rows in the Z direction. The center of the small lens 321a arranged in the center of the Z direction generally coincides with the optical axis OA when viewed from the Y direction. Therefore, in the maximum light blocking state, the center of the small lens 321a where the intensity of a light beam is high is arranged in the region between the ends 74a and 74b on the optical axis OA side of the pair of light blocking sections 70a and 70b. However, the positions of the ends 74a and 74b are set different from each other in the optical axis OA direction by the dimmer 10 according to this embodiment. Consequently, since the separation distance between the ends 74a and 74b can be secured in the optical axis OA direction, it is possible to reduce the separation distance between the ends 74a and 74b in the plane perpendicular to the optical axis OA. Therefore, in the maximum light blocking state, it is possible to improve an extinction ratio even if the center of the small lens 321a is arranged in the region between the ends 74a and 74b.

Third Embodiment

Figure 18:
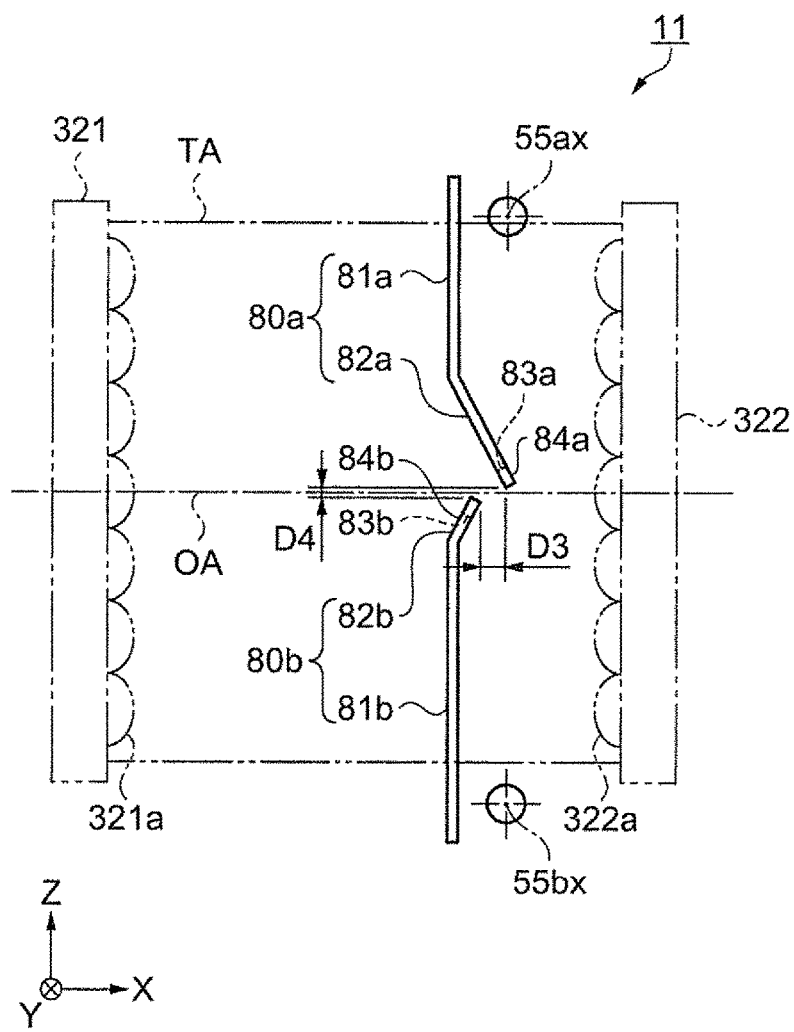
FIG. 18 is a diagram showing a schematic configuration of light blocking sections of a dimmer according to a third embodiment.

FIG. 18 is a diagram showing a schematic configuration of light blocking sections 80a and 80b of a dimmer 11 according to a third embodiment. Schematic configurations of the dimmer 11 according to this embodiment and the light blocking sections 80a and 80b are explained with reference to FIG. 18. FIG. 18 is a diagram of the sections of components different from those of the dimmer 10 according to the second embodiment. The maximum light blocking state of the light blocking sections 80a and 80b is shown.

In the dimmer 11 according to this embodiment, the shape of the light blocking sections 80a and 80b is different from the shape of the light blocking sections 70a and 70b in the second embodiment. Pivot axes 55ax and 55bx for causing the light blocking sections 80a and 80b to pivot are associated with the action of the light blocking sections 80a and 80b. Therefore, the pivot axes 55ax and 55bx are set in positions different from the positions of the pivot axes 52ax and 52bx in the second embodiment. The other components are substantially the same as those in the second embodiment.

The light blocking sections 80a and 80b include third light blocking members 81a and 81b and fourth light blocking members 82a and 82b formed to extend from the distal ends on the optical axis OA side of the third light blocking members 81a and 81b and bend along the optical axis OA. The third light blocking members 81a and 81b are configured the same as the third light blocking members 71a and 71b in the second embodiment. The fourth light blocking members 82a and 82b are different from the fourth light blocking members 72a and 72b in the second embodiment.

The fourth light blocking members 82a and 82b bend to the optical path downstream side with respect to the third light blocking members 81a and 81b. Specifically, one fourth light blocking member 82a bends from the distal end of one third light blocking member 81a to the optical path downstream side at large inclination length. The other fourth light blocking member 82b bends from the distal end of the other third light blocking member 81b to the optical path downstream side at small inclination length compared with the fourth light blocking member 82a.

Arcuate third cutout sections 83a and 83b symmetrical with respect to the XZ plane passing the optical axis OA is provided at the ends 84a and 84b of the fourth light blocking members 82a and 82b with the optical axis OA set in substantially the center. In this embodiment, one third cutout section 83b is formed larger than the other third cutout section 83a.

With this configuration, the positions in the direction along the optical axis OA of the end 84a on the optical axis OA side of the fourth light blocking member 82a and the end 84b on the optical axis OA side of the fourth light blocking member 82b are different from each other. When viewed from the Y direction, one end 84a is located on the optical path downstream side and the other end 84b is located on the optical path upstream side compared with the end 84a. Therefore, the ends 84a and 84b in the X direction (the direction along the optical axis OA) have a separation distance D3 therebetween. The separation distance D3 is set and secured as a distance necessary for preventing the fourth light blocking members 82a and 82b from interfering with each other according to the pivoting of the light blocking sections 80a and 80b when fluctuation in machining accuracy of the light blocking sections 80a and 80b and assembly accuracy of the dimmer 11 is taken into account.

When the light blocking sections 80a and 80b are in the maximum light blocking state, the ends 84a and 84b have a separation distance D4 at which the ends 84a and 84b nearly overlap each other in a plane (the YZ plane) perpendicular to the optical axis OA when viewed from the X direction. Therefore, the ends 84a and 84b in the Z direction have the separation distance D4 therebetween. The separation distance D4 is set small compared with the past. Therefore, in the case of the maximum light blocking state, it is possible to suppress the passing light amount compared with the past and improve an extinction ratio.

When the light blocking sections 80a and 80b are in the maximum opened state, although not shown in the figure, as in the second embodiment, the light blocking sections 80a and 80b pivot about the pivot axes 55ax and 55bx and are located on the outer side of the passing region TA to stop. As in the second embodiment, in the case of the maximum opened state, the light blocking sections 80a and 80b do not block passage of a light beam.

According to the third embodiment, it is possible to accomplish effects same as the effects in the second embodiment.

Fourth Embodiment

Figure 19:
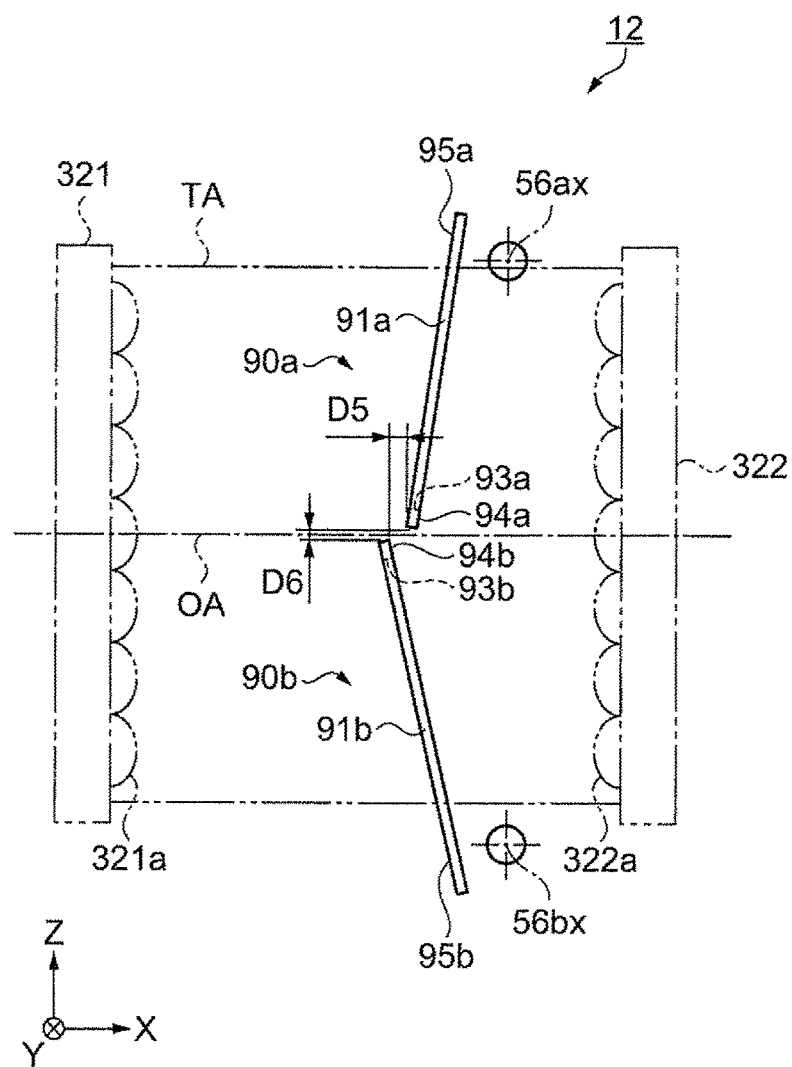
FIG. 19 is a diagram showing a schematic configuration of light blocking sections of a dimmer according to a fourth embodiment.

FIG. 19 is a diagram showing a schematic configuration of light blocking sections 90a and 90b of a dimmer 12 according to a fourth embodiment. Schematic configurations of the dimmer 12 according to this embodiment and the light blocking sections 90a and 90b are explained with reference to FIG. 19. FIG. 19 is a diagram of sections of components different from those of the dimmer 10 according to the second embodiment. The maximum light blocking state of the light blocking sections 90a and 90b is shown.

In the dimmer 12 according to this embodiment, the shape of the light blocking sections 90a and 90b is different from the shape of the light blocking sections 70a and 70b in the second embodiment. Pivot axes 56ax and 56bx for causing the light blocking sections 90a and 90b to pivot are associated with the action of the light blocking sections 90a and 90b. Therefore, the pivot axes 56ax and 56bx are set in positions different from the positions of the pivot axes 52ax and 52bx in the second embodiment. The other components are substantially the same as those in the second embodiment.

The light blocking sections 90a and 90b include only a pair of third light blocking members 91a and 91b. The bent fourth light blocking members 72a and 72b in the second embodiment are not formed. The third light blocking members 91a and 91b are set in an inclined state such that, in the maximum light blocking state, ends 94a and 94b on the optical axis OA side are located on the optical path upstream side compared with proximal ends 95a and 95b on the pivot axes 56ax and 56bx side. Arcuate third cutout sections 93a and 93b symmetrical with respect to the XZ plane passing the optical axis OA are provided at the ends 94a and 94b of the third light blocking members 91a and 91b with the optical axis OA set in substantially the center. In this embodiment, one third cutout section 93b is formed larger than the other third cutout section 93a.

In the maximum light blocking state, the positions in the direction along the optical axis OA of the ends 94a and 94b of the third light blocking members 91a and 91b are different from each other. When viewed from the Y direction, one end 94a is located on the optical path downstream side and the other end 94b is located on the optical path upstream side compared with the end 94a. Therefore, the ends 94a and 94b in the X direction (the direction along the optical axis OA) have a separation distance D5 therebetween. As in the second embodiment, the separation distance D5 is set and secured as a distance necessary for preventing the third light blocking members 91a and 91b from interfering with each other according to the pivoting of the light blocking sections 90a and 90b when fluctuation in machining accuracy of the light blocking sections 90a and 90b and assembly accuracy of the dimmer 12 is taken into account.

When the light blocking sections 90a and 90b are in the maximum light blocking state, the ends 94a and 94b have a separation distance D6 at which the ends 94a and 94b nearly overlap each other in a plane (the YZ plane) perpendicular to the optical axis OA when viewed from the X direction. Therefore, the ends 94a and 94b in the Z direction have the separation distance D6 therebetween. The separation distance D6 is set small compared with the past. Therefore, in the case of the maximum light blocking state, it is possible to suppress the passing light amount compared with the past and improve an extinction ratio.

When the light blocking sections 90a and 90b are in the maximum opened state, although not shown in the figure, as in the second embodiment, the light blocking sections 90a and 90b pivot about the pivot axes 59ax and 59bx and are located on the outer side of the passing region TA to stop. As in the second embodiment, in the case of the maximum opened state, the light blocking sections 90a and 90b do not block passage of a light beam.

According to the fourth embodiment, it is possible to accomplish effects same as the effects in the second embodiment. Further, since the light blocking sections 90a and 90b can be formed compact, it is possible to realize a reduction in the size of the dimmer 12.

The exemplary embodiments of the invention are explained above with reference to the accompanying drawings. However, it goes without saying that the invention is not limited to the embodiments. It is evident that those skilled in the art can arrive at various modifications and alterations without departing from the technical idea described in the appended claims. It is understood that the modifications and the alterations naturally belong to the technical scope of the invention. The modifications are explained below.

In the configuration in the first embodiment, the second cutout sections 622a and 622b are provided. However, the invention is not always limited to this configuration. A configuration without the second cutout sections 622a and 622b may be adopted. However, for suppression of color unevenness, it is desirable to provide the second cutout sections 622a and 622b.

Figure 20:
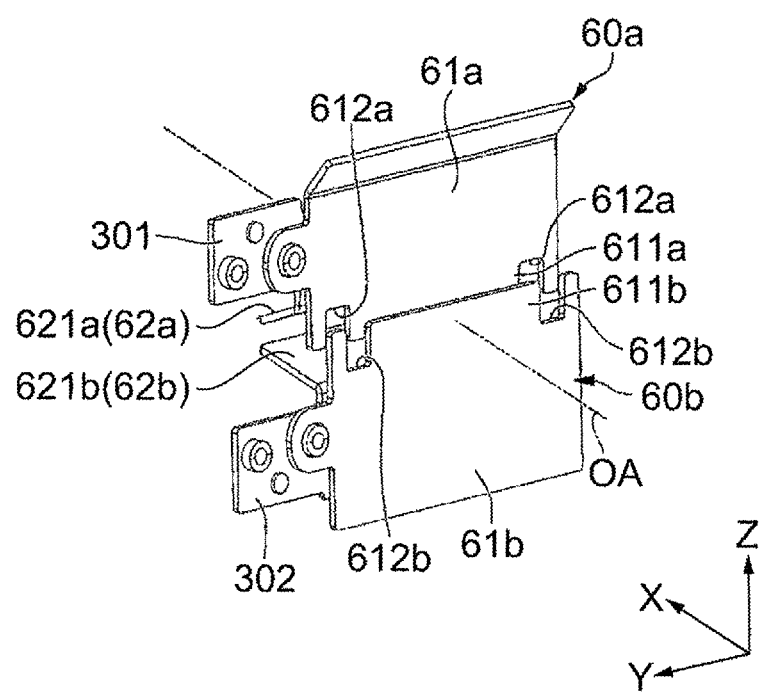
FIG. 20 is a diagram showing another configuration example of first cutout sections in the first embodiment.

In the first embodiment, the first cutout sections 612a and 612b are provided to respectively cut off both end sides in the width directions of the ends 611a and 611b of the first light blocking members 61a and 61b. However, the invention is not always limited to this configuration. As shown in FIG. 20 showing another configuration example of the first cutout sections 612a and 612b, the first cutout sections 612a and 612b may be formed in a slit shape.

In the first embodiment, the light blocking sections 60a and 60b are each formed by sticking together the two light blocking members (the first light blocking member 61a and the second light blocking member 62a and the first light blocking member 61b and the second light blocking member 62b). However, for example, only the end 621a may be provided in the first light blocking member 61a.

In the dimmer 10 according to the second embodiment, in the case of the maximum light blocking state, the end 74a is located on the Z direction distal end side and the end 74b is located on the Z direction proximal end side. However, the end 74a may be extended to be located on the Z direction proximal end side and the end 74b may be extended to be located on the Z direction distal end side. In this case, the ends 74a and 74b need to properly have the separation distance D1 for preventing the fourth light blocking members 72a and 72b from interfering with each other according to the pivoting of the light blocking sections 70a and 70b. When such a configuration is adopted, in the maximum light blocking state, it is possible to eliminate a passing light amount by the third cutout sections 73a and 73b as much as possible. This is the same in the third and fourth embodiments.

In the dimmer 10 according to the second embodiment, the gears 51a and 51b have the same teeth shape. However, in the maximum light blocking state and the maximum opened state, in order to set the light blocking sections 70a and 70b in the positional relation shown in FIGS. 17A and 17B, the diameters of the gears 51a and 51b are set different. However, the light blocking sections 70a and 70b only have to be formed not to block passage of a light beam in the maximum opened state. When there is room in space on the light blocking section 70b side in the maximum opened state, the diameters of the gears 51a and 51b may be the same.

In the dimmer 10 according to the second embodiment, the third cutout sections 73a and 73b are formed in the arcuate shape. Specifically, the third cutout sections 73a and 73b have the substantially bow-shaped contour. However, the third cutout sections 73a and 73b are not limited to the arcuate shape and only have to be formed in a shape that can make a change in a passing light amount gentle. This is the same in the third and fourth embodiments.

In the dimmer 10 according to the second embodiment, one third cutout section 73b is formed larger than the other third cutout section 73a. However, the sizes of the third cutout sections 73a and 73b only have to be determined such that passing light amounts of light passing the third cutout sections 73a and 73b are equal when the opening area viewed from the X direct of the third cutout sections 73a and 73b changes according to a change in a pivot angle. This is the same in the third and fourth embodiments.

In the dimmer 10 according to the second embodiment, the third light blocking members 71a and 71b are set to be perpendicular to the optical axis OA in the maximum light blocking state. However, the invention is not limited to this configuration. Like the setting of the third light blocking members 91a and 91b in the fourth embodiment, the third light blocking members 71a and 71b may be set to be inclined such that the distal ends on the optical axis OA side of the third light blocking members 71a and 71b are located on the optical path upstream side compared with the ends of the pivot axes 52ax and 52bx. When the third light blocking members 71a and 71b are set to be inclined in this way, in particular, in the maximum light blocking state, a light beam blocked and reflected by the third light blocking members 71a and 71b can be directed to the outer side with respect to the optical axis OA and prevented from directly returning to the light source device 31. Consequently, it is possible to suppress a temperature rise of the light source device 31. This is the same in the third embodiment.

In the dimmer 10 according to the second embodiment, the light blocking sections 70a and 70b include the third cutout sections 73a and 73b. However, the invention is not limited to this configuration. The light blocking sections 70a and 70b may not include the third cutout sections 73a and 73b. When such a configuration is adopted, as in the configuration explained above, it is possible to improve contrast compared with the past. This is the same in the third and fourth embodiments.

In the first lens array 321 according to the second embodiment, the small lenses 321a are arrayed in an odd number of rows in the Z direction. The center of the small lens 321a arranged in the center in the Z direction generally coincides with the optical axis OA when viewed from the Y direction. However, the invention is not limited to this configuration. The small lenses 321a may be arrayed in an even number of rows in the Z direction. The optical axis OA may not include the center of the small lens 321a. A boundary of the small lens 321a and a peripheral region of the boundary may be arranged on the optical axis OA. This is the same in the third and fourth embodiments.

In the dimmer 10 according to the second embodiment, the light blocking sections 70a and 70b are configured as a mechanism that opens and closes in the Z direction. However, the light blocking sections 70a and 70b may be configured as a mechanism that opens and closes in the Y direction. This is the same in the third and fourth embodiments.

The optical unit 3 in the first embodiment adopts a so-called 3CCD system in which the three light modulating devices (the liquid crystal light valves 352) corresponding to the R light, the G light, and the B light are used. However, the invention is not limited to the 3CCD system. A light modulating device of a 1CCD system may be adopted. A light modulating device for improving contrast may be adopted.

The optical unit 3 in the first embodiment adopts the transmission-type light modulating device (the transmission-type liquid crystal light valve 352). However, the invention is not limited to the transmission-type light modulating device. A reflection-type light modulating device may be adopted.

This application is based upon and claims the benefit of priority from Japanese Patent Application No. 2011-176578 filed on Aug. 12, 2011 and Japanese Patent Application No. 2011-182510 filed on Aug. 24, 2011, the entire contents of all of which are incorporated herein by reference.

What is claimed is:

1. A dimmer that blocks an incident light beam and adjusts a passing light amount, the dimmer comprising:
   a pair of pivoting sections provided across an optical axis of the light beam and having pivot axes that extend along a direction substantially orthogonal to the optical axis;
   a first light blocking section and a second light blocking section held by the pair of pivoting sections, formed to extend in the direction substantially orthogonal to the optical axis, and configured to pivot following pivoting of the pivoting sections to block the light beam, wherein
   in a state in which the passing light amount is the smallest, a position of an end of the first light blocking section is different than an end of the second light blocking section in the optical axis direction, and the end of the first light blocking section opposes the end of the second light blocking section, and
   first cutout sections are provided on two opposite side ends on the optical axis side of the first light blocking section and second cutout sections are provided on two opposite side ends on the optical axis side of the second light blocking section,
   the first light blocking section and the second light blocking section including:
      first light blocking members formed to extend in the direction substantially orthogonal to the optical axis in the state in which the passing light amount is the smallest; and
      second light blocking members formed on an optical path downstream side of the light beam with respect to the first light blocking members to incline with respect to the first light blocking members such that distal end sides of the second light blocking members separate from the first light blocking members, and first ends of the second light blocking members extend from a non-end portion of the first light blocking members and second ends of the second light blocking members are a same distance from a downstream optical element.

2. The dimmer according to claim 1, wherein the opposed ends on the optical axis side of the first light blocking section and the second light blocking section are arranged to overlap each other in a direction along the optical axis in the state in which the passing light amount is the smallest.

3. The dimmer according to claim 1, wherein the first light blocking section and the second light blocking section include:
   first light blocking members formed to extend in the direction substantially orthogonal to the optical axis in the state in which the passing light amount is the smallest; and
   second light blocking members formed on an optical path downstream side of the light beam with respect to the first light blocking members to incline with respect to the first light blocking members such that distal end sides of the second light blocking members separate from the first light blocking members.

4. The dimmer according to claim 3, wherein
   the first cutout sections are provided in the first light blocking members, and
   second cutout sections are provided in a center of opposed distal ends on the optical axis side of the second light blocking members.

5. The dimmer according to claim 1, wherein
   the first light blocking section and the second light blocking section include:
   third light blocking members formed to extend in the direction substantially orthogonal to the optical axis; and
   fourth light blocking members formed to extend from distal ends on the optical axis side of the third light blocking members and bend to the optical axis side in the state in which the passing light amount is the smallest, and
   positions in the direction along the optical axis of opposed ends on the optical axis side of the fourth light blocking members are different from each other.

6. The dimmer according to claim 5, wherein
   one fourth light blocking member is formed to bend from the distal end on the optical axis side of one third light blocking member to an optical path downstream side of the light beam, and
   the other fourth light blocking member is formed to bend from the distal end on the optical axis side of the other third light blocking member to an optical path upstream side of the light beam.

7. The dimmer according to claim 1, wherein third cutout sections are provided in a center of distal ends on the optical axis side of the first light blocking section and the second light blocking section.

8. The dimmer according to claim 7, wherein, in the first light blocking section and the second light blocking section, at least one of sizes and shapes of the third cutout sections are different from each other.

9. The dimmer according to claim 1, wherein
   the first light blocking section and the second light blocking section are formed to extend in different directions substantially orthogonal to the optical axis, and
   in the state in which the passing light amount is the smallest, distal ends of each of the light blocking sections on the optical axis side of the first light blocking section and the second light blocking section are in different positions from each other along the optical axis direction.

10. The dimmer according to claim 1, wherein
    in the state in which the passing light amount is the smallest, a face of one of the first light blocking section and the second light blocking section facing the incident light is in a different position along the optical axis of the incident light than a face of an other one of the first light blocking section and the second light blocking section facing the incident light.

11. A projector comprising:
    a light source device that emits a light beam;
    a light modulating device that modulates the light beam according to an image signal and forms image light; and
    a dimmer including:
        a pair of pivoting sections provided across an optical axis of the light beam and having pivot axes that extend along a direction substantially orthogonal to the optical axis;
        a first light blocking section and a second light blocking section held by the pair of pivoting sections, formed to extend in the direction substantially orthogonal to the optical axis, and configured to pivot following pivoting of the pivoting sections to block the light beam,
    in a state in which a passing light amount is the smallest, a position of an end of the first light blocking section is different than an end of the second light blocking section in the optical axis direction, and the end of the first light blocking section opposes the end of the second light blocking section, and
    first cutout sections are provided on two opposite side ends on the optical axis side of the first light blocking section and second cutout sections are provided on two opposite side ends on the optical axis side of the second light blocking section,
    the first light blocking section and the second light blocking section including:
        first light blocking members formed to extend in the direction substantially orthogonal to the optical axis in the state in which the passing light amount is the smallest; and
        second light blocking members formed on an optical path downstream side of the light beam with respect to the first light blocking members to incline with respect to the first light blocking members such that distal end sides of the second light blocking members separate from the first light blocking members, and first ends of the second light blocking members extend from a non-end portion of the first light blocking members and second ends of the second light blocking members are a same distance from a downstream optical element.

12. The projector according to claim 11, wherein, in the dimmer, the opposed ends on the optical axis side of the first light blocking section and the second light blocking section are arranged to overlap each other in a direction along the optical axis in the state in which the passing light amount is the smallest.

13. The projector according to claim 11, further comprising a lens array including a plurality of small lenses that convert the light beam emitted from the light source device into partial light beams, wherein
    the dimmer is arranged on an opposite side of the light source device with respect to the lens array, and
    when viewed from the optical axis side, a center of at least one small lens among the plurality of small lenses is arranged in a region between the optical axis side ends of the first light blocking section and the second light blocking section in the state in which the passing light amount is the smallest.

14. The projector according to claim 11,
the first light blocking section and the second light blocking section are formed to extend in different directions substantially orthogonal to the optical axis, and
in the state in which the passing light amount is the smallest, distal ends of each of the light blocking sections on the optical axis side of the first light blocking section and the second light blocking section are in different positions from each other along the optical axis direction.

15. The projector according to claim 11, wherein
in the state in which the passing light amount is the smallest, a face of one of the first light blocking section and the second light blocking section facing the light beam is in a different position along the optical axis of the light beam than a face of an other one of the first light blocking section and the second light blocking section facing the light beam.

16. A dimmer that blocks an incident light beam and adjusts a passing light amount, the dimmer comprising:
a pair of pivoting sections provided across an optical axis of the light beam and having pivot axes that extend along a direction substantially orthogonal to the optical axis;
a first light blocking section and a second light blocking section held by the pair of pivoting sections, formed to extend in the direction substantially orthogonal to the optical axis, and configured to pivot following pivoting of the pivoting sections to block the light beam, wherein
in a state in which the passing light amount is the smallest, a position of an end of the first light blocking section is different than an end of the second light blocking section in the optical axis direction, and the end of the first light blocking section opposes the end of the second light blocking section, and
first cutout sections are provided on two opposite side ends on the optical axis side of the first light blocking section and second cutout sections are provided on two opposite side ends on the optical axis side of the second light blocking section,
the first light blocking section and the second light blocking section including:
third light blocking members formed to extend in the direction substantially orthogonal to the optical axis; and
fourth light blocking members formed to extend from distal ends on the optical axis side of the third light blocking members and bend to the optical axis side in the state in which the passing light amount is the smallest, and
positions in the direction along the optical axis of opposed ends on the optical axis side of the fourth light blocking members are different from each other,
one fourth light blocking member is formed to bend from the distal end on the optical axis side of one third light blocking member to an optical path downstream side of the light beam, and
the other fourth light blocking member is formed to bend from the distal end on the optical axis side of the other third light blocking member to an optical path upstream side of the light beam.

* * * * *